US006965905B2

(12) United States Patent
Garthwaite

(10) Patent No.: US 6,965,905 B2
(45) Date of Patent: Nov. 15, 2005

(54) LOCK-FREE, PARALLEL REMEMBERED SETS

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 495 days.

(21) Appl. No.: 10/325,003

(22) Filed: Dec. 20, 2002

(65) Prior Publication Data

US 2004/0122874 A1   Jun. 24, 2004

(51) Int. Cl.[7] ............................................. G06F 17/30
(52) U.S. Cl. .................................... 707/206; 707/200
(58) Field of Search .............................. 707/1, 2, 3, 4, 707/5, 6, 7, 8, 9, 10, 100, 101, 102, 103, 707/206; 711/170–173, 200–209; 719/312, 719/313, 314, 315; 709/312; 717/140, 116, 717/158

(56) References Cited

U.S. PATENT DOCUMENTS

| | | | | |
|---|---|---|---|---|
| 6,185,581 B1 * | 2/2001 | Garthwaite | .................. | 707/206 |
| 6,226,653 B1 * | 5/2001 | Alpern et al. | ................ | 707/206 |
| 6,363,403 B1 * | 3/2002 | Roy et al. | .................... | 707/206 |
| 6,381,738 B1 * | 4/2002 | Choi et al. | ................... | 717/140 |
| 6,424,977 B1 * | 7/2002 | Garthwaite | .................. | 707/206 |
| 6,490,599 B2 * | 12/2002 | Kolodner et al. | ........... | 707/206 |
| 6,826,757 B2 * | 11/2004 | Steele et al. | ................. | 719/314 |
| 6,845,437 B2 * | 1/2005 | Borman et al. | .............. | 711/173 |
| 6,868,488 B2 * | 3/2005 | Garthwaite | .................. | 711/173 |

OTHER PUBLICATIONS

Jones and Lins, "Garbage Collection: Algorithms for Automatic Dynamic Memory Management," 1996, pp. 165-179, Wiley, New York.

Paul Wilson, "Uniprocessor Garbage Collection Techniques," Technical Report, University of Texas, 1994.

Hudson and Moss, "Incremental Collection of Mature Objects," Proceedings of International Workshop on Memory Management, 1992, Springer-Verlag.

Grarup and Seligmann, "Incremental Mature Garbage Collection," M.Sc. Thesis, Available at http://www.daimi.au.dk/~jacobse/Papers/, 1995.

Seligmann and Grarup, "Incremental Mature Garbage Collection Using the Train Algorithm," Proceedings of ECOOP '95, Ninth European Conference on Object-Oriented Programming, 1995, http://www.daimi.au.dk/~jacobse/Papers/.

(Continued)

Primary Examiner—Charles Rones
Assistant Examiner—Yicun Wu
(74) Attorney, Agent, or Firm—Kudirka & Jobse, LLP

(57) ABSTRACT

A multi-threaded garbage collector operates in increments and maintains, for each of a plurality of car sections in which it has divided a portion of the heap, a respective remembered set of the locations at which it has found references to objects in those car sections. It stores the remembered sets in respective hash tables, whose contents it updates in a scanning operation, executed concurrently by multiple threads, in which it finds references and records their locations in the appropriate tables. Occasionally, one of the threads replaces the hash table for a given car section. Rather than wait for the replacement operation to be completed, a thread that has an entry to be made into that car section's remembered set accesses the old table to find out whether the entry has already been made. If so, no new entry is necessary. Otherwise, it places an entry into the old table and sometimes places an insertion record containing that entry into a linked list associated with that car section. When the reclaiming thread has finished transferring information from the old table to the new table, it transfers information from the linked list of insertion records into the new table, too. In this way, the replacement process is not a bottleneck to other threads' performing update operations.

32 Claims, 34 Drawing Sheets

OTHER PUBLICATIONS

Clark and Mason, "Compacting Garbage Collection can be Fast and Simple," Software-Practice and Experience, Feb. 1996, pp. 177-194, vol. 26, No. 2.

Henry Baker, "List Processing in Real Time on a Serial Computer," Communications of the ACM 21, 4, Apr. 1978, pp. 280-294.

Appel, Ellis and Li; "Real-time Concurrent Collection on Stock Multiprocessors," ACM SIGPLAN Notices, 1988.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984, Austin, Texas.

Herlihy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam and Moher, "Effective Static-Graph Reorganization to Improve Locality in Garbage Collected Systems," Proceedings of ACM SIGPLAN Conference on Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 404-425.

Chilimbi and Larus, "Using Generational Garbage Collection to Implement Cache-Conscious Data Placement," International Symposium on Memory Management, Oct. 1998.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul.

Hudson and Hosking, "Remembered sets can also play cards," in OOPSLA/ECOOP Workshop on Garbage Collection in Object-Oriented Systems, Oct. 1993, Edited by Moss, Wilson, and Zorn.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988.

* cited by examiner

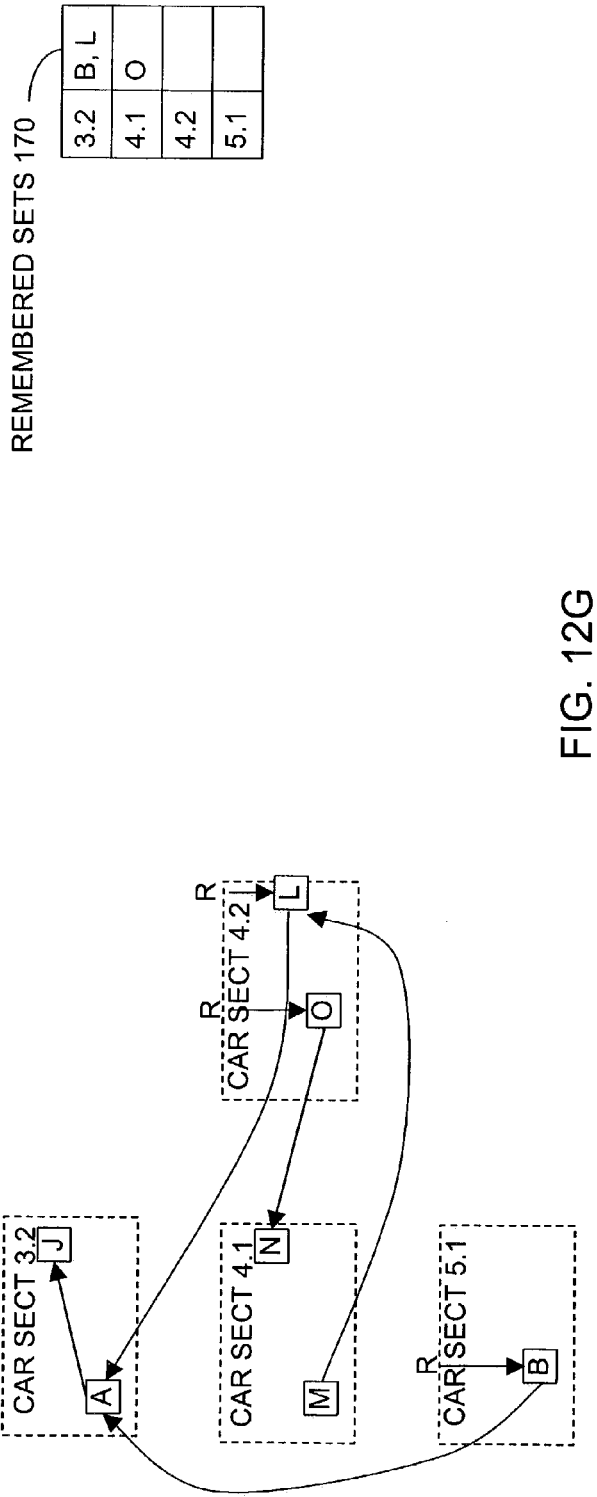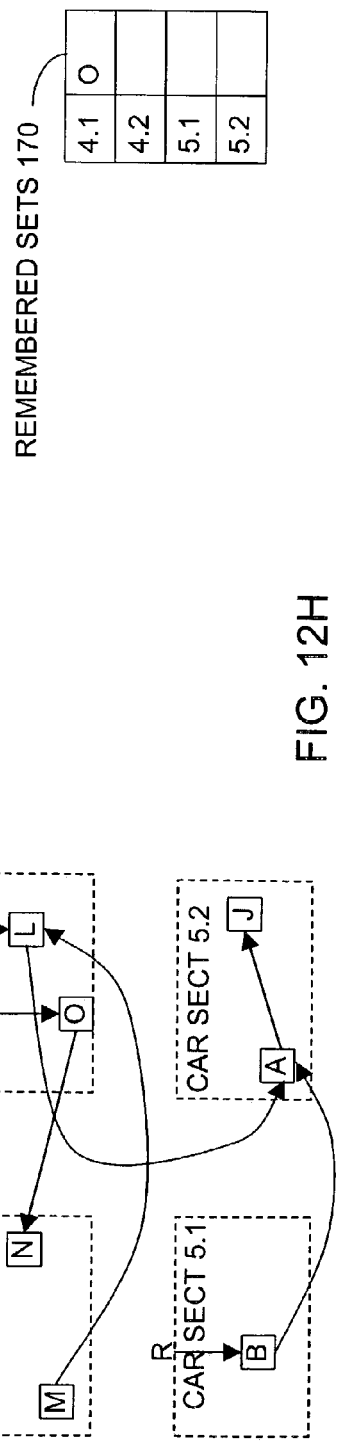
FIG. 12G
FIG. 12H

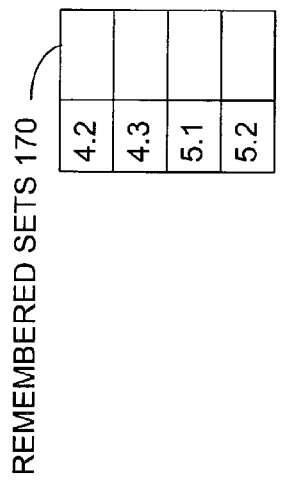
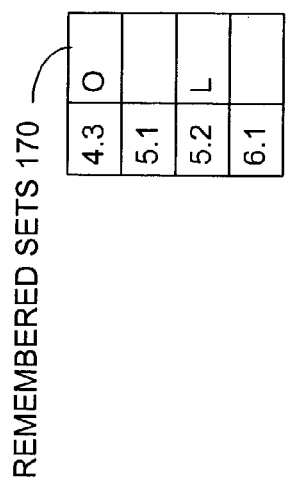
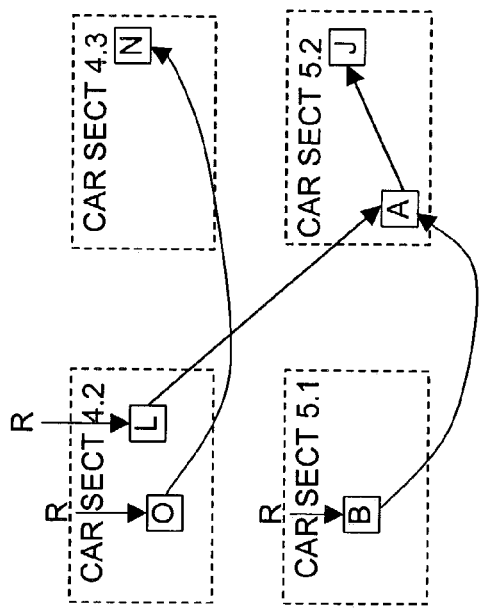
FIG. 12I
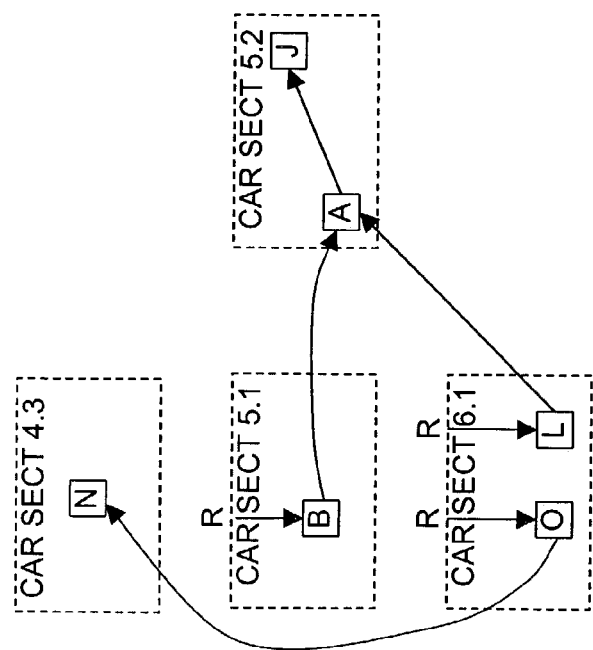
FIG. 12J

LOCK-FREE, PARALLEL REMEMBERED SETS

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have is associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modern systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do not use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection cycle. To illustrate how such updating and other collection operations may be carried out, FIGS. 8A and 8B (together, "FIG. 8") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is recorded appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is with-held from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to is object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12J depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

From the foregoing description, it can be appreciated that maintaining remembered sets for respective cars greatly expedites incremental collection. Since the remembered sets keep track of which locations have been found during previous increments to contain references to a car's objects, the collector needs to scan only those regions that the mutator has reported to have been modified since the preceding increment. Collectors that employ the train algorithm are not the only ones that employ remembered sets for this purpose. Other incremental collectors also divide the heap or portions of it into heap sections with which they associate respective remembered sets, and they use them in successive increments to remember the references into those heap sections that the collector discovered during previous increments. But train-algorithm collectors give a good example of how remembered sets are employed and the operational problems that they present.

One of those problems is the memory cost that they exact. The structure in which a car's remembered set is recorded can require considerable memory if the car contains objects to which a lot of references refer. To minimize remembered sets' memory "footprint," the memory blocks initially allocated to the structures containing the remembered sets typically are much smaller than some cars require. This approach is generally beneficial, because many cars will not need remembered-set structures any larger than that, at least during most of their lives.

Another expense that remembered sets exact is the time required to maintain them. For one thing, it is important to avoid duplicate entries in the remembered set. So the operation of adding an entry is actually relatively time-consuming, since it involves searching the remembered set to determine whether an entry already exists for the location of the reference that the collector has found. Usually the remembered-set data structure is implemented as a hash table in order to expedite the search operation, but the search operation is still time-consuming. Of course, it is less time-consuming than scanning the entire heap during each collection increment would be. But it still exacts a cost, one that workers in this field have worked diligently to minimize.

In systems that are multi-threaded, for example, they have taken advantage of the parallel nature that most aspects of remembered-set maintenance exhibit. But a potential bottleneck arises when the size of the remembered set becomes too great for the structure allocated to it. In such a case, a new structure needs to be allocated. When this happens, some type of transfer operation needs to be performed in order to make the new structure's entries identify all of the locations that the old structure's entries did. This operation is time-consuming and does not lend itself well to parallel performance. So other threads may experience significant idle time while the thread replacing the remembered-set structure is performing that task.

SUMMARY OF THE INVENTION

I have devised a way of avoiding such idle time. It employs a concept that in some ways is reminiscent of a technique described in Oyama et al., Executing Parallel Programs with Synchronization Bottlenecks Efficiently, *Proceeding of the International Workshop on Parallel and Distributed Computing for Symbolic and Irregular Applications*, July 1999. Specifically, when a thread is in the process of replacing a table in which a remembered set's entries are stored, another thread attempting to make an entry into that remembered set at the same time can simply leave an "insertion record," which tells the table-replacing thread to add a specified entry to the new table when the opportunity to do so presents itself.

According to the invention, though, the thread attempting to make the entry into the remembered set is not necessarily denied access to the table being replaced. It may, for example, read some of that table's contents to determine whether the remembered set already includes the desired entry and therefore does not need to have it entered. Or it may place an entry into the table and dispense with adding an insertion record if the table-replacing thread's operation of transferring information from the old table to the new one has not reached the table slot where the new entry was made. The invention thus enables other threads to avoid waiting for the table-replacing thread while minimizing the burden that doing so places on the table-replacing thread

BRIEF DESCRIPTION OF THE DRAWINGS

The invention description below refers to the accompanying drawings, of which:

FIGS. 12A–12J, discussed above, are diagrams that illustrate a collection scenario that can result from using the train algorithm;

DETAILED DESCRIPTION OF AN ILLUSTRATIVE EMBODIMENT

Although the present invention's applicability is not limited to collectors that employ the train algorithm, we will assume for the sake of concreteness that the illustrated embodiment employs that algorithm, and we will therefore refer to the heap sections with which remembered sets are associated as "car" sections.

Figure 1:
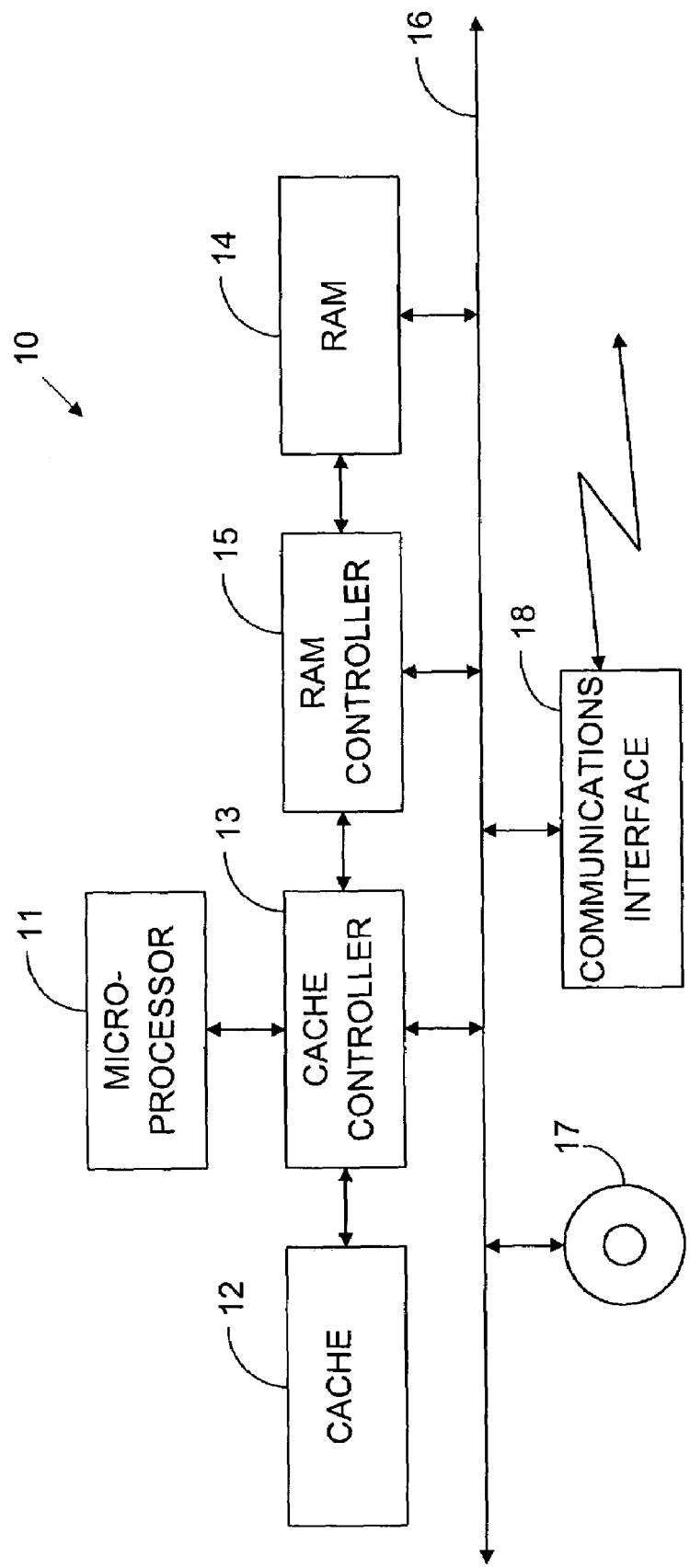
FIG. 1, discussed above, is a block diagram of a computer system in which the present invention's teachings can be practiced.
Figure 2:
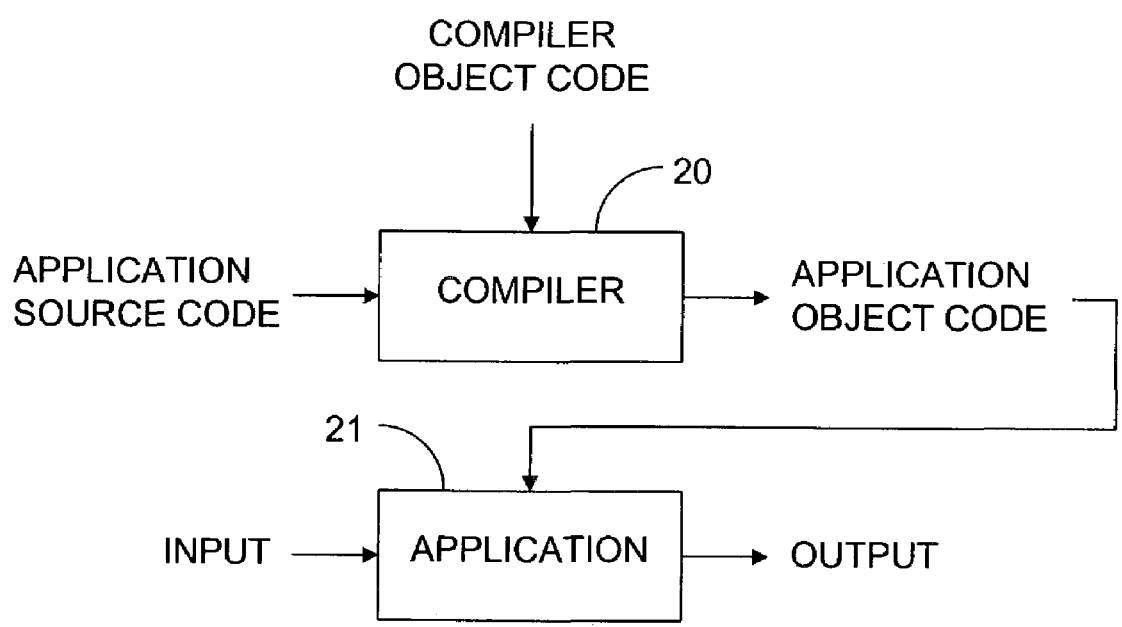
FIG. 2 is, discussed above, is a block diagram that illustrates a compiler's basic functions.
Figure 3:
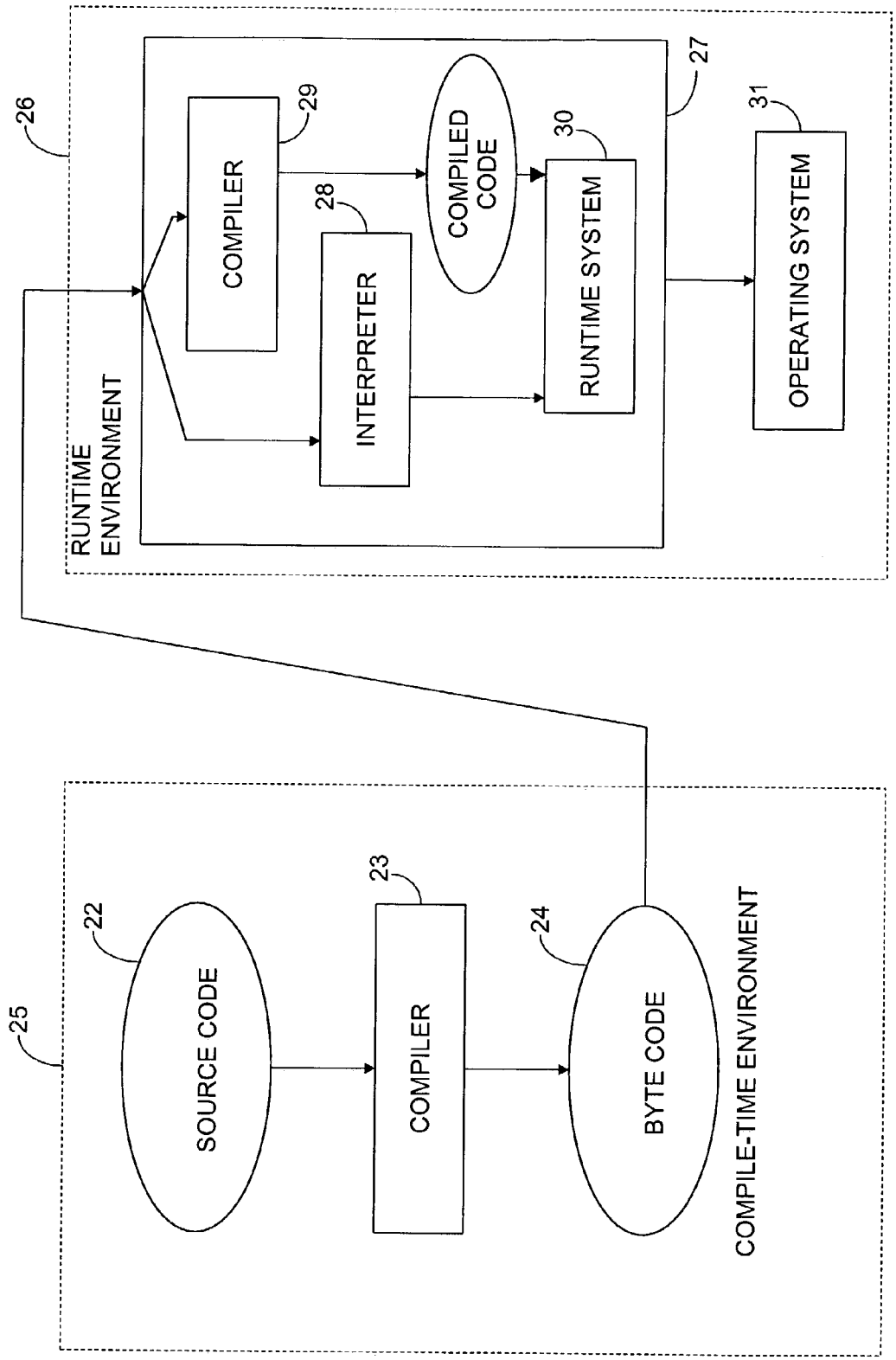
FIG. 3, discussed above, is a block diagram that illustrates a more-complicated compiler/interpreter organization.
Figure 4:
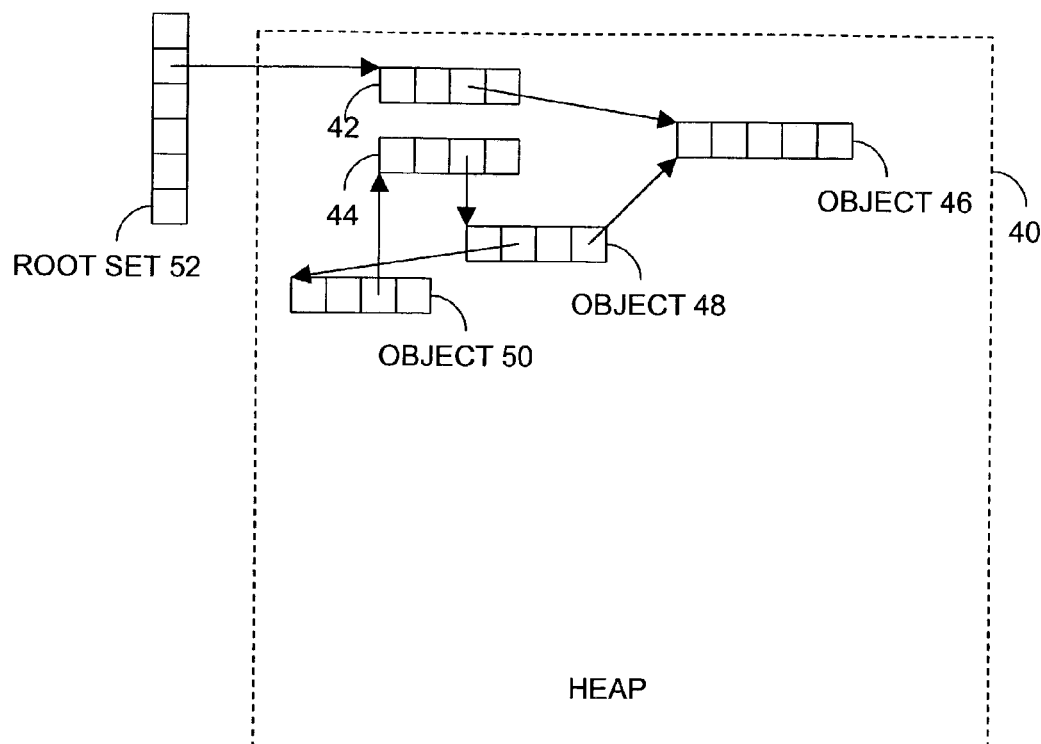
FIG. 4, discussed above, is a diagram that illustrates a basic garbage-collection mechanism.
Figure 5:
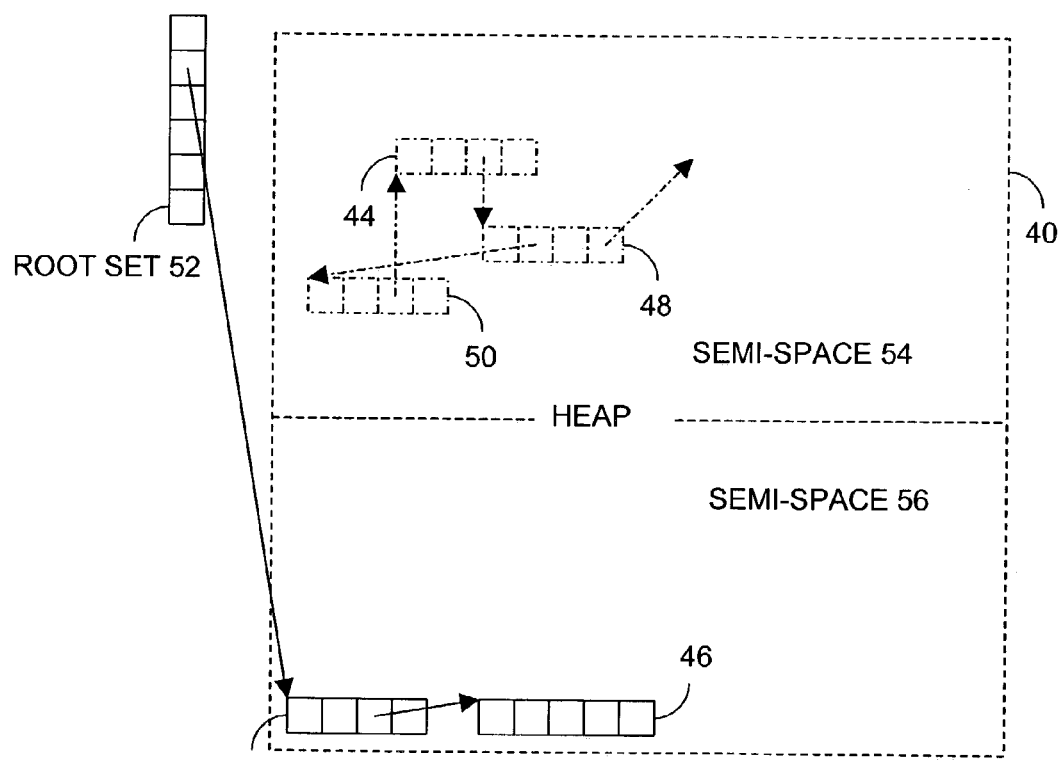
FIG. 5, discussed above, is a similar diagram illustrating that garbage-collection approach's relocation operation.
Figure 6:
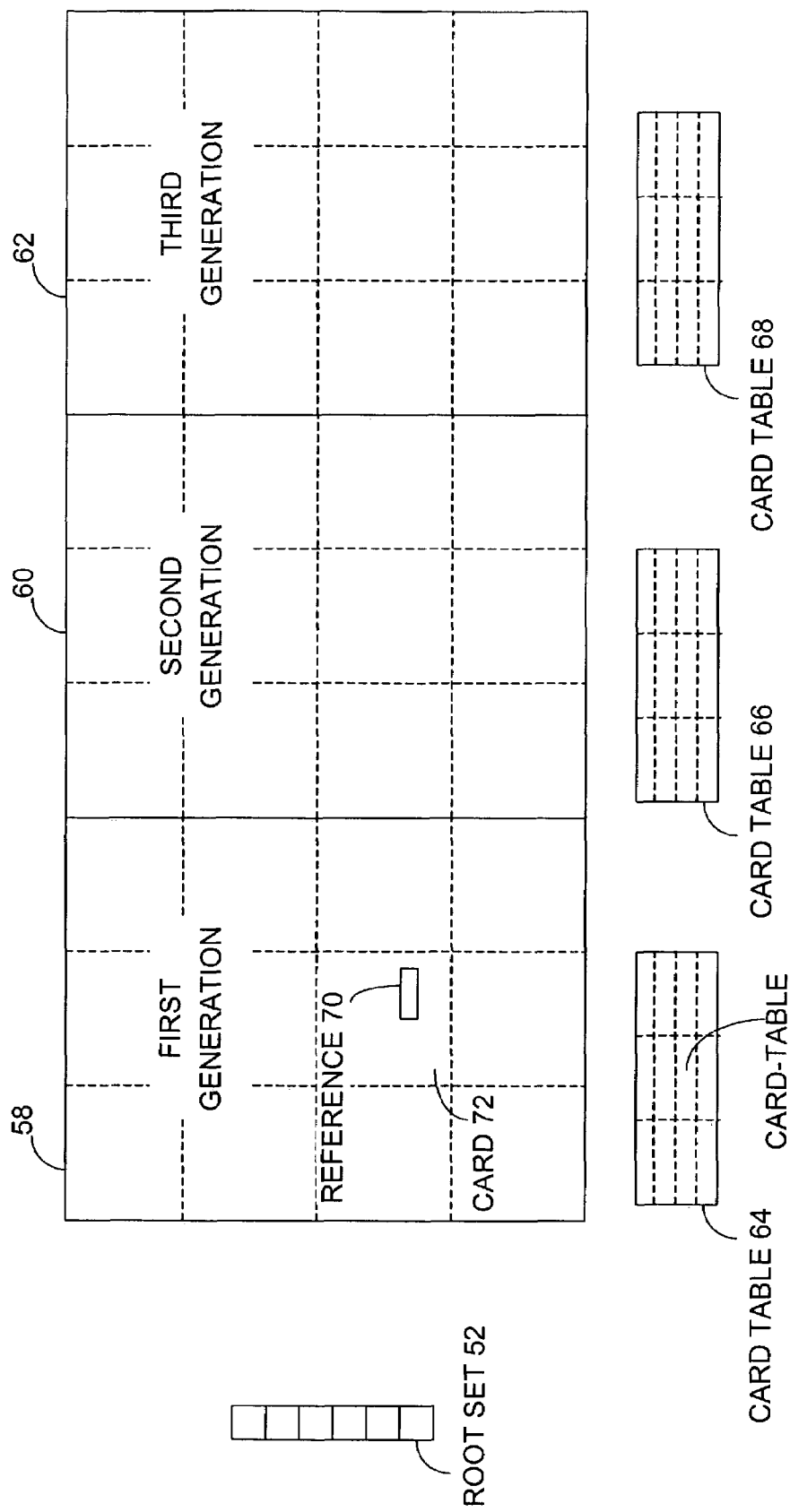
FIG. 6, discussed above, is a diagram that illustrates a garbage-collected heap's organization into generations.
Figure 7:
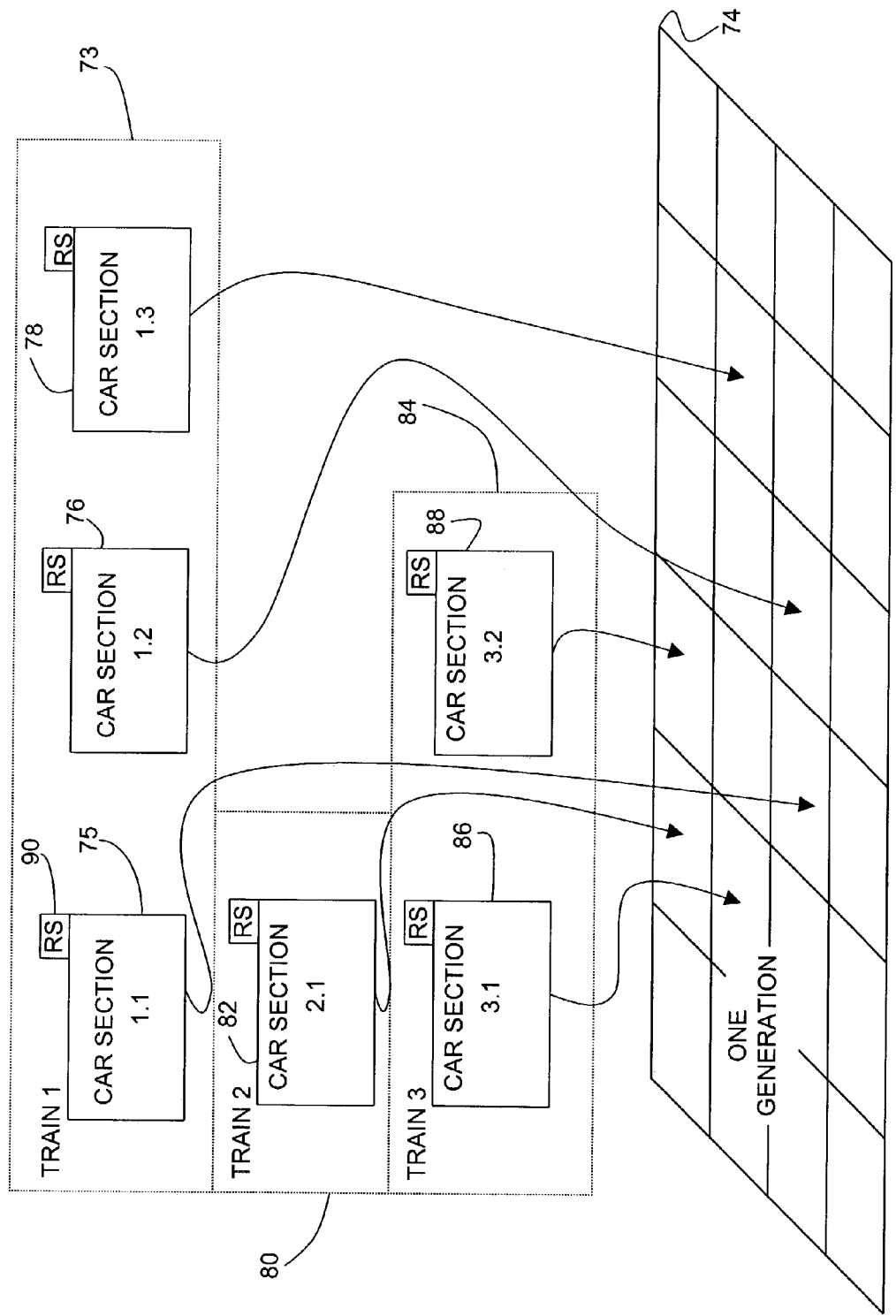
FIG. 7, discussed above, is a diagram that illustrates a generation organization employed for the train algorithm.
Figure 8A:
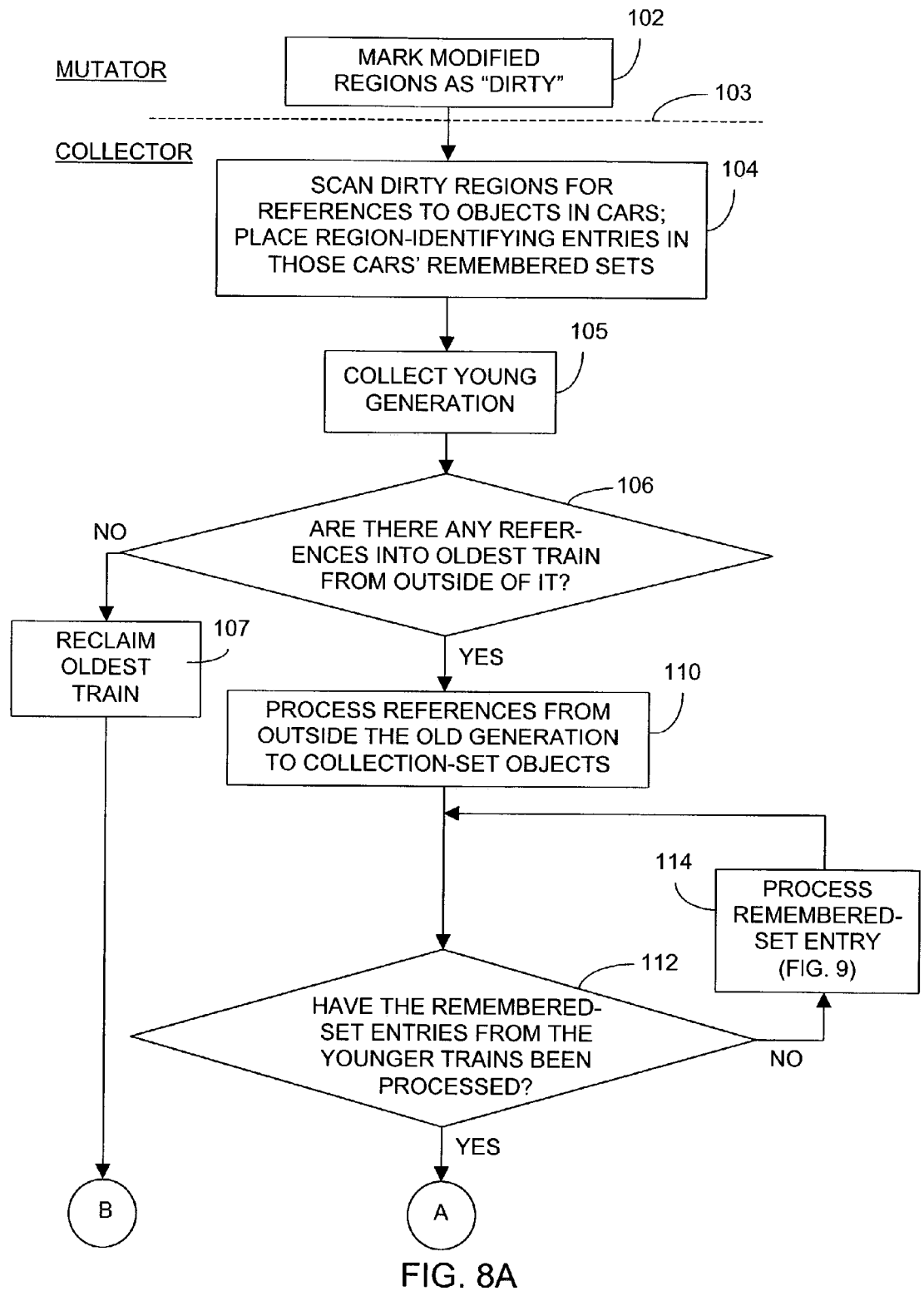
FIGS. 8A and 8B, discussed above, together constitute a flow chart that illustrates a garbage-collection interval that includes old-generation collection.
Figure 8B:
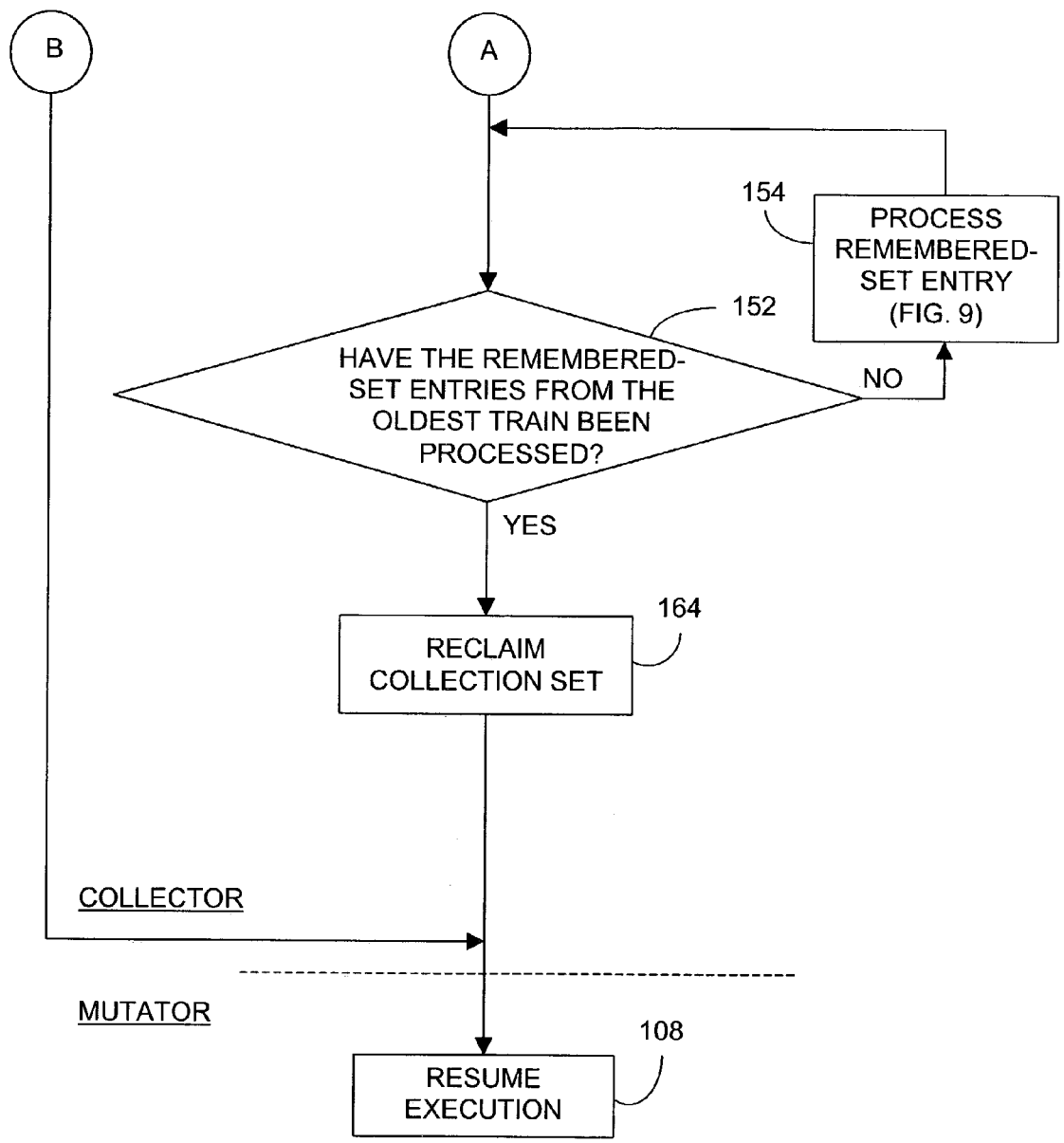
Figure 9:
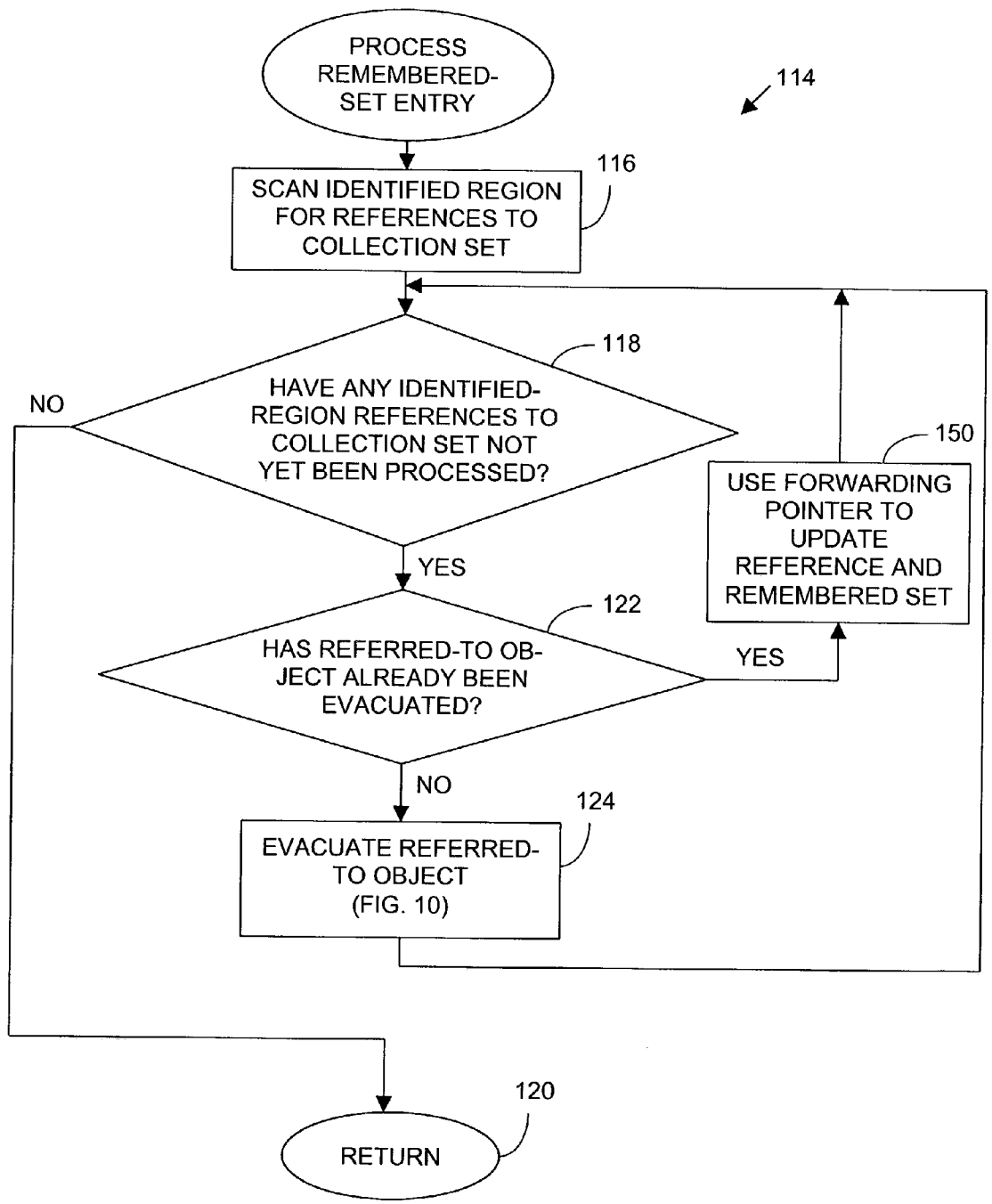
FIG. 9, discussed above, is a flow chart that illustrates in more detail the remembered-set processing included in FIG. 8A.
Figure 10:
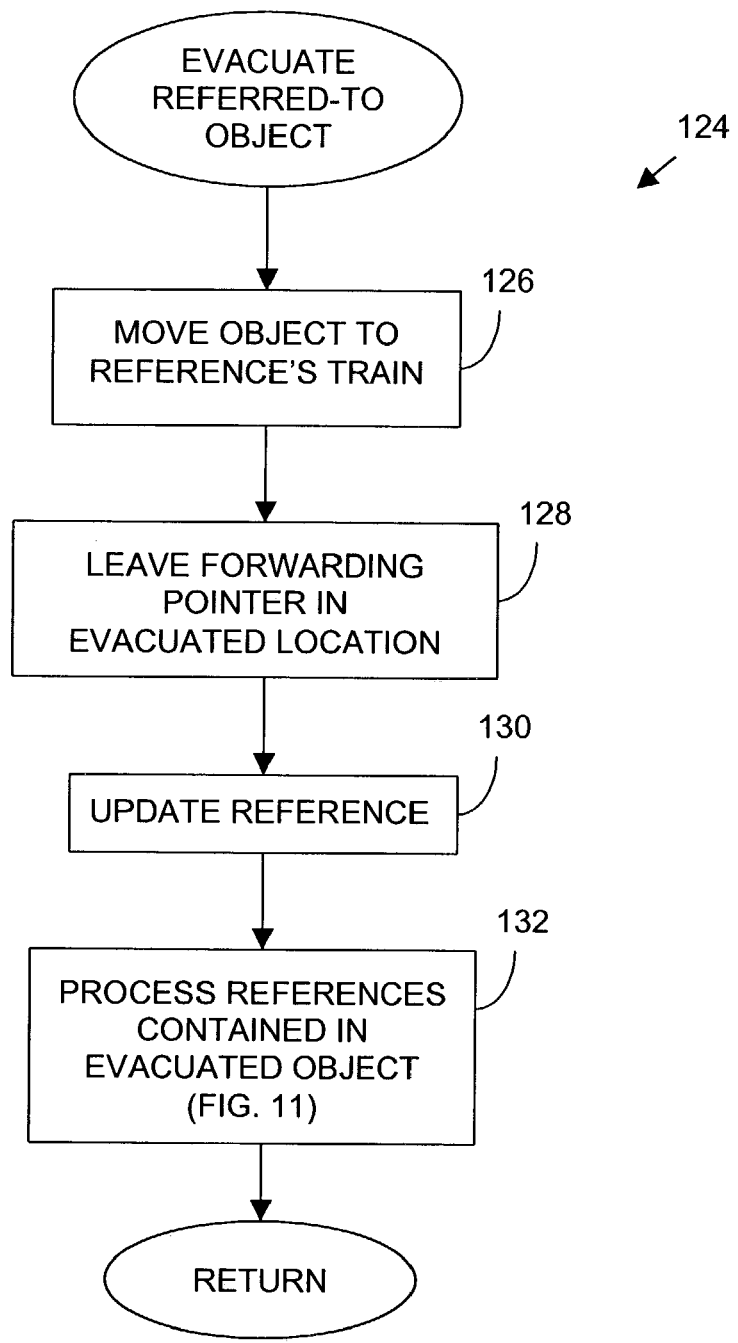
FIG. 10, discussed above, is a block diagram that illustrates in more detail the referred-to-object evacuation that FIG. 9 includes.
Figure 11A:
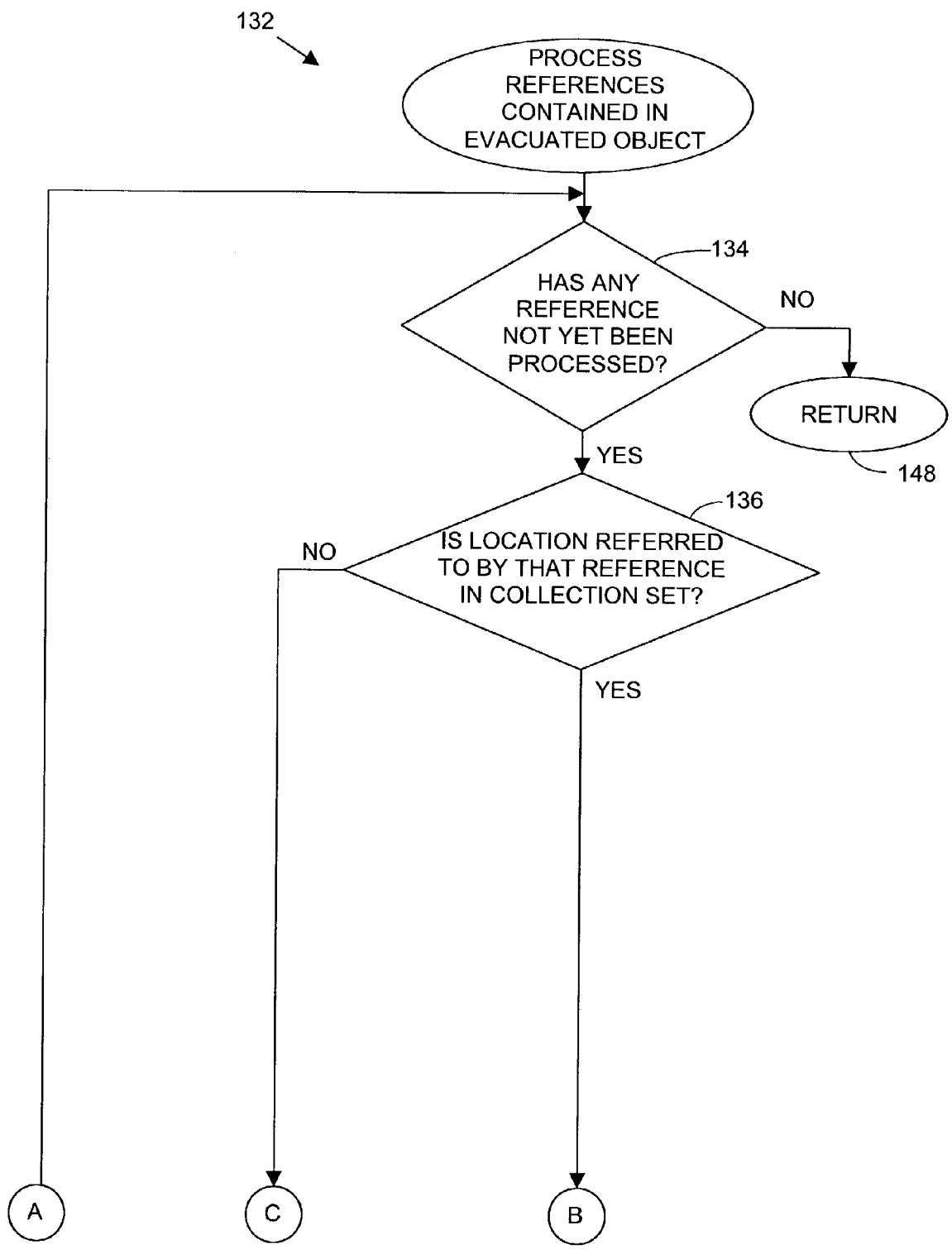
FIGS. 11A and 11B, discussed above, together form a flow chart that illustrates in more detail the FIG. 10 flow chart's step of processing evacuated objects' references.
Figure 11B:
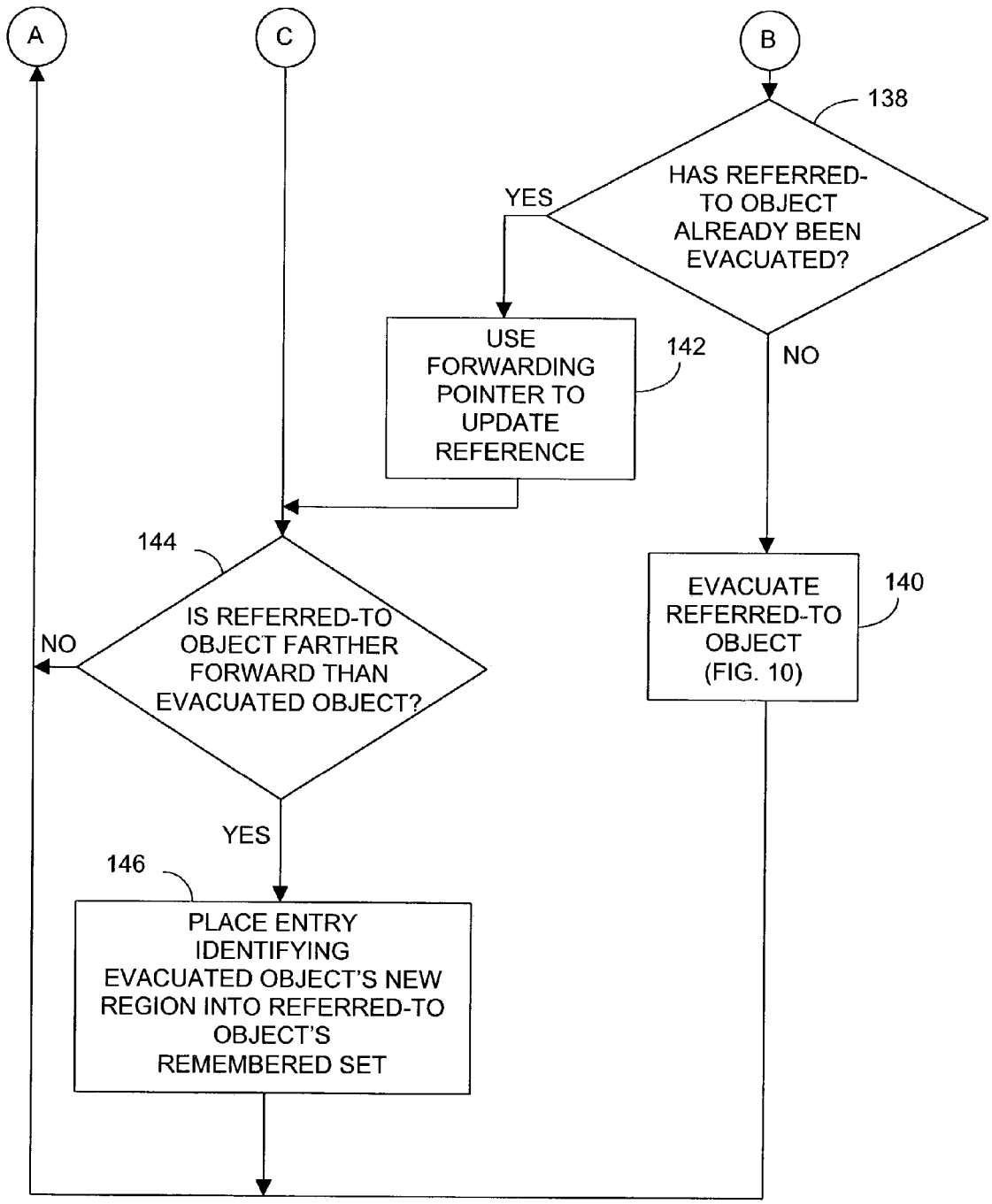
Figure 12A:
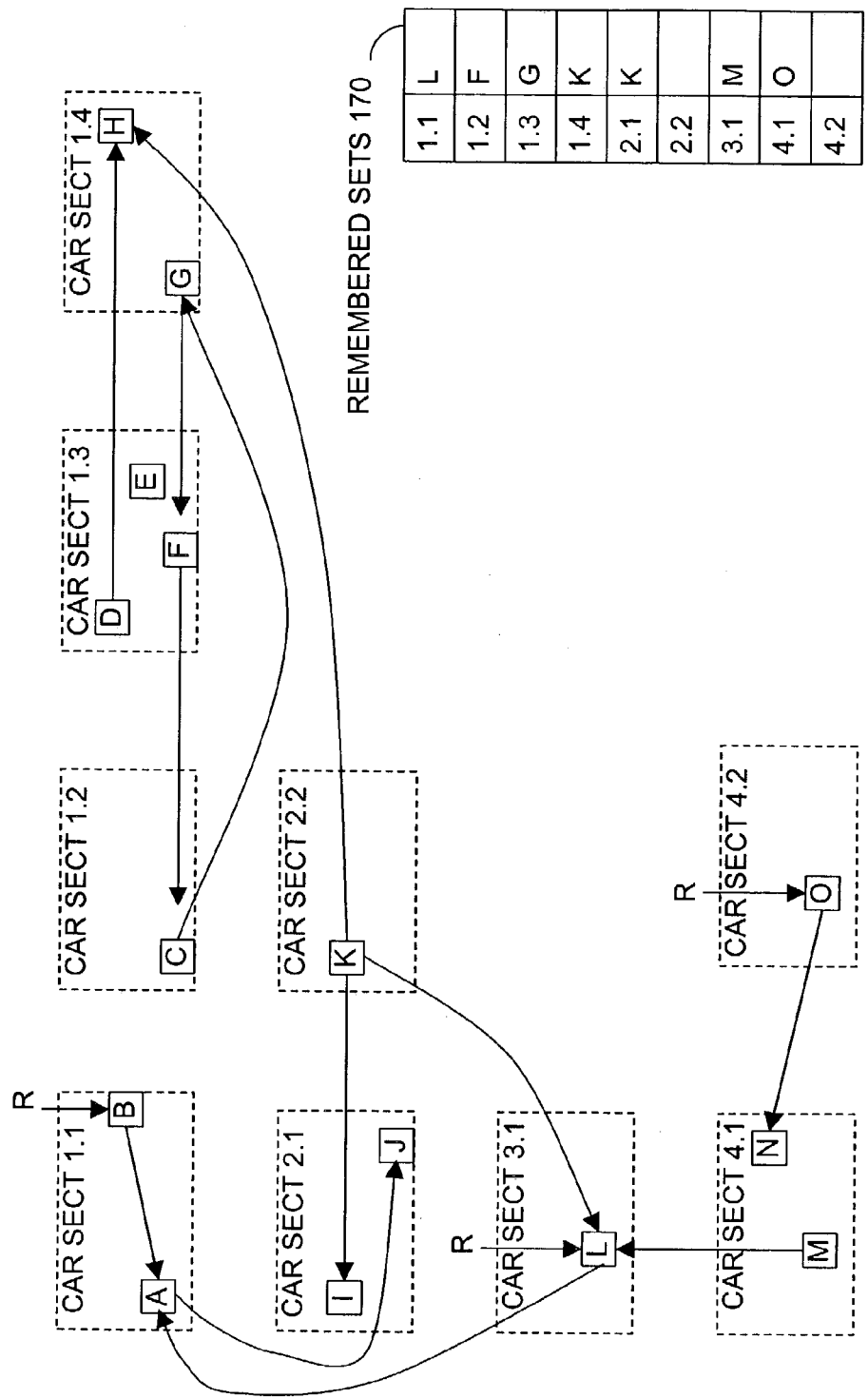
Figure 12B:
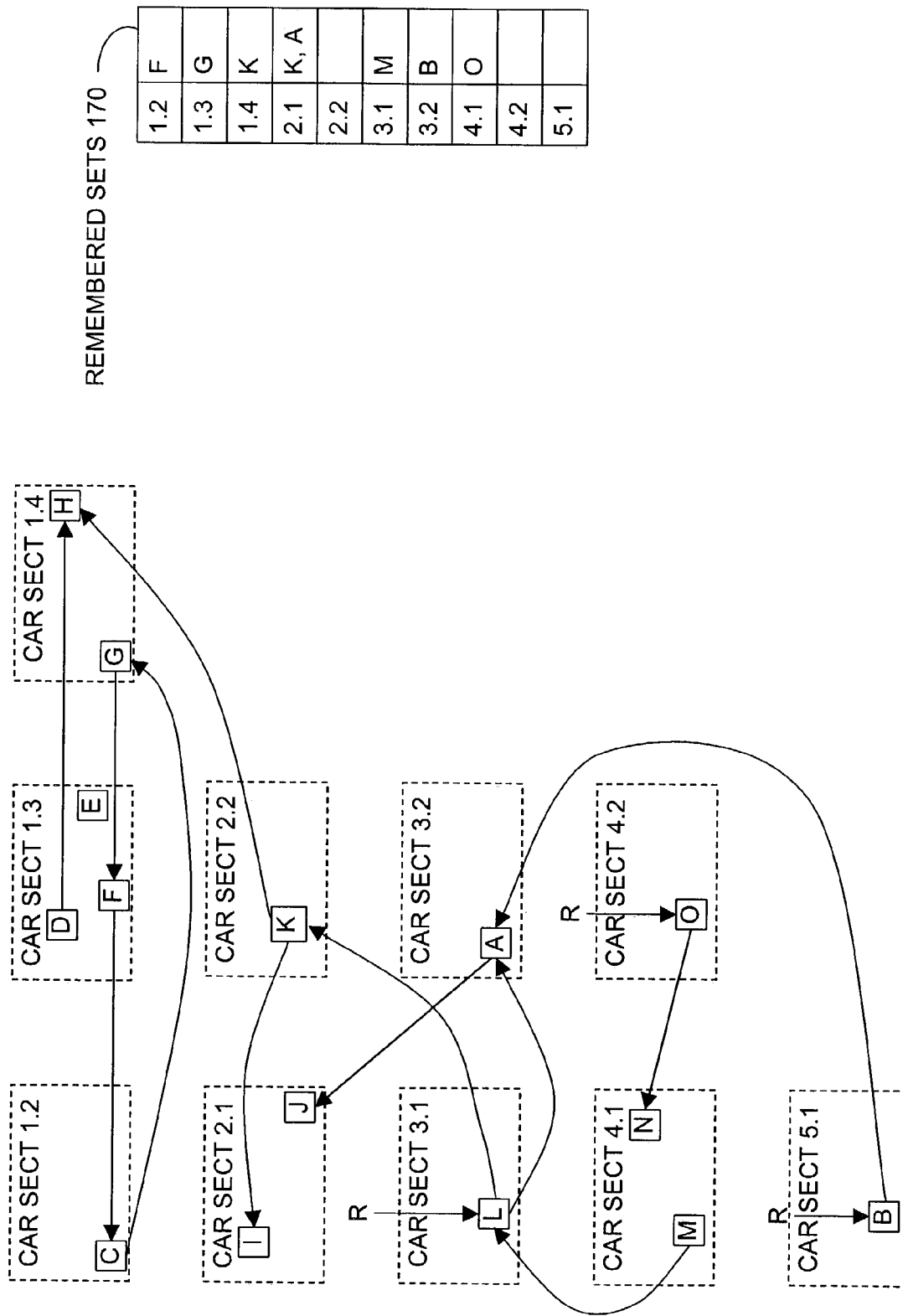
Figure 12C:
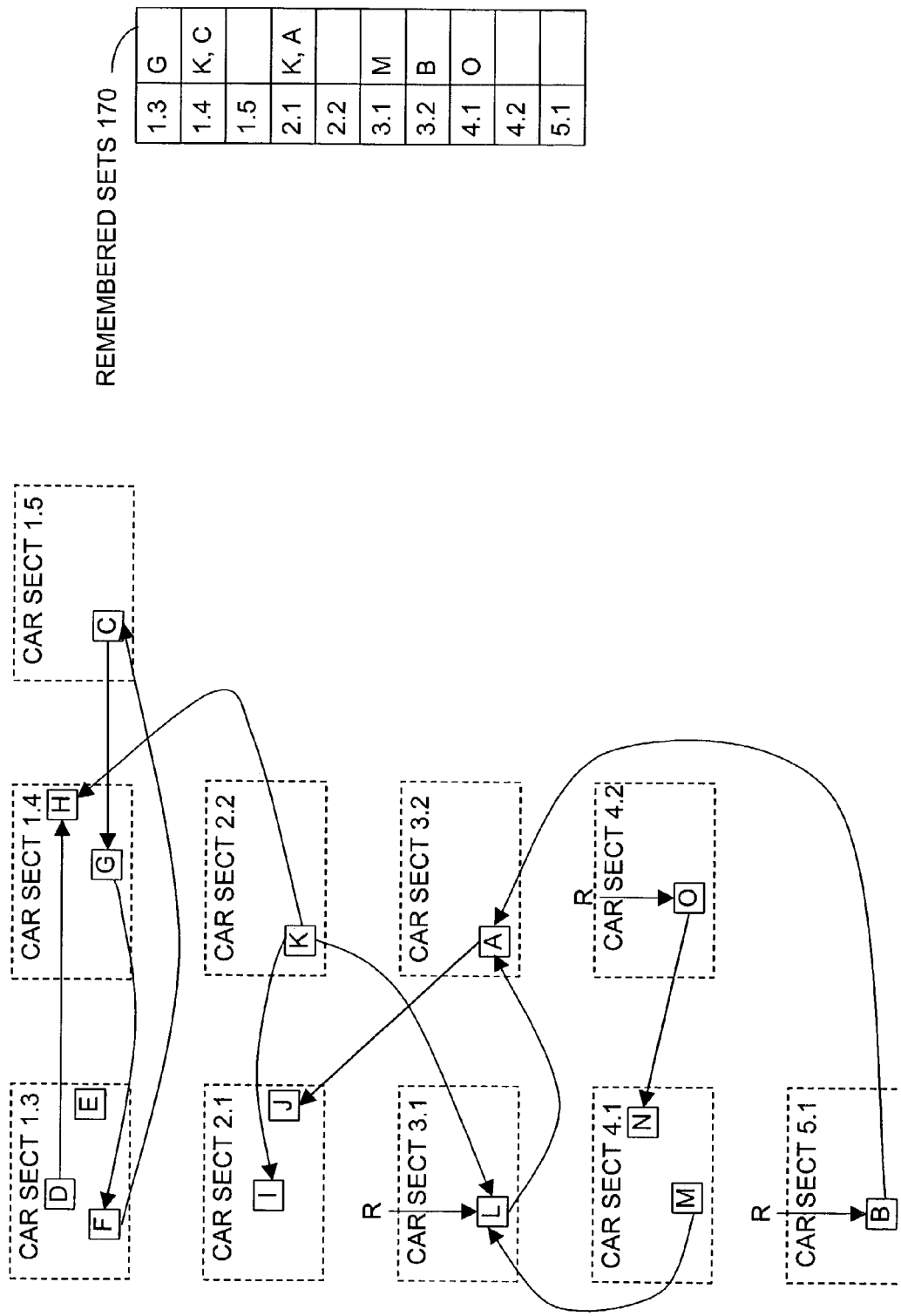
Figure 12D:
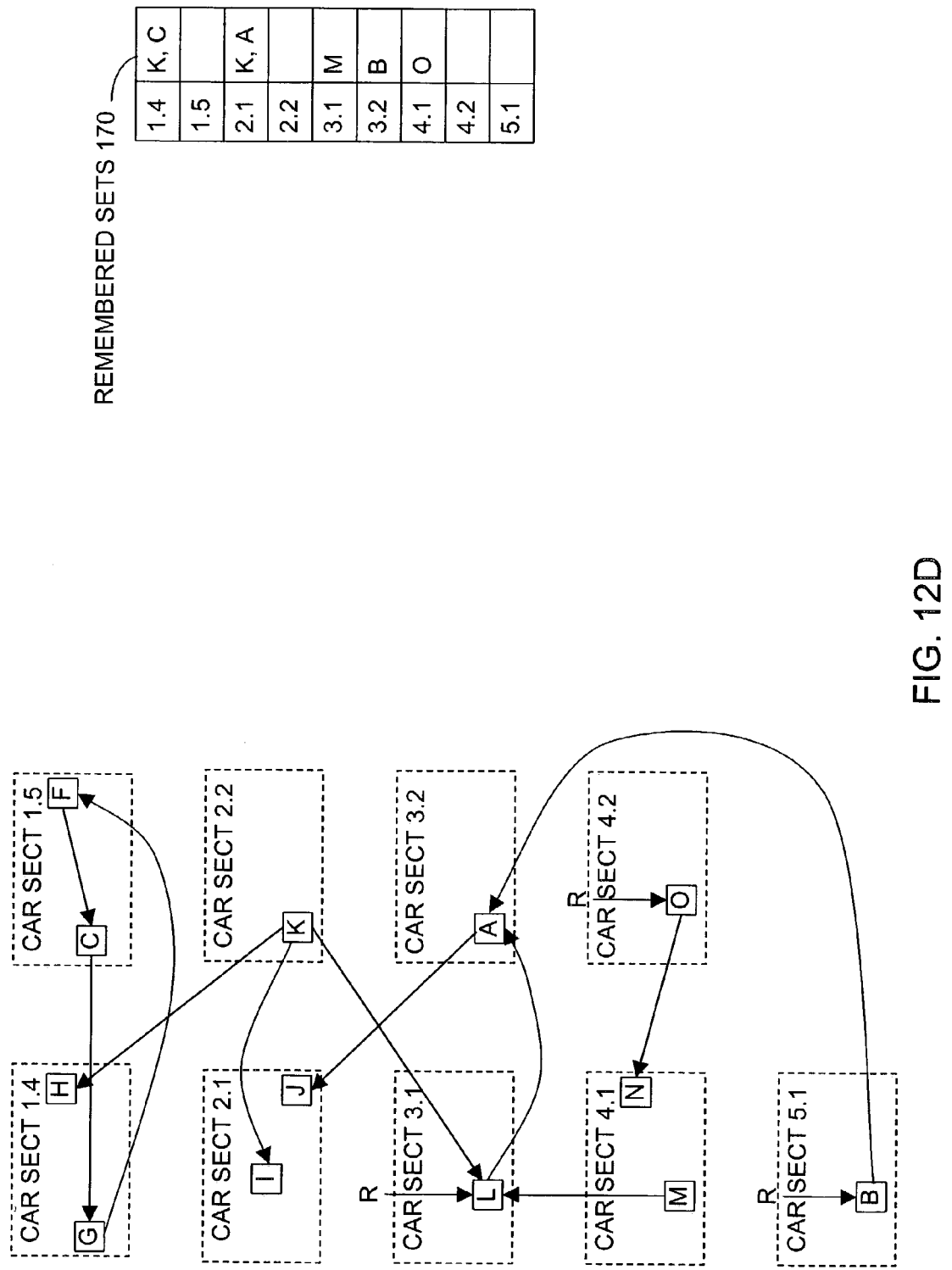
Figure 12E:
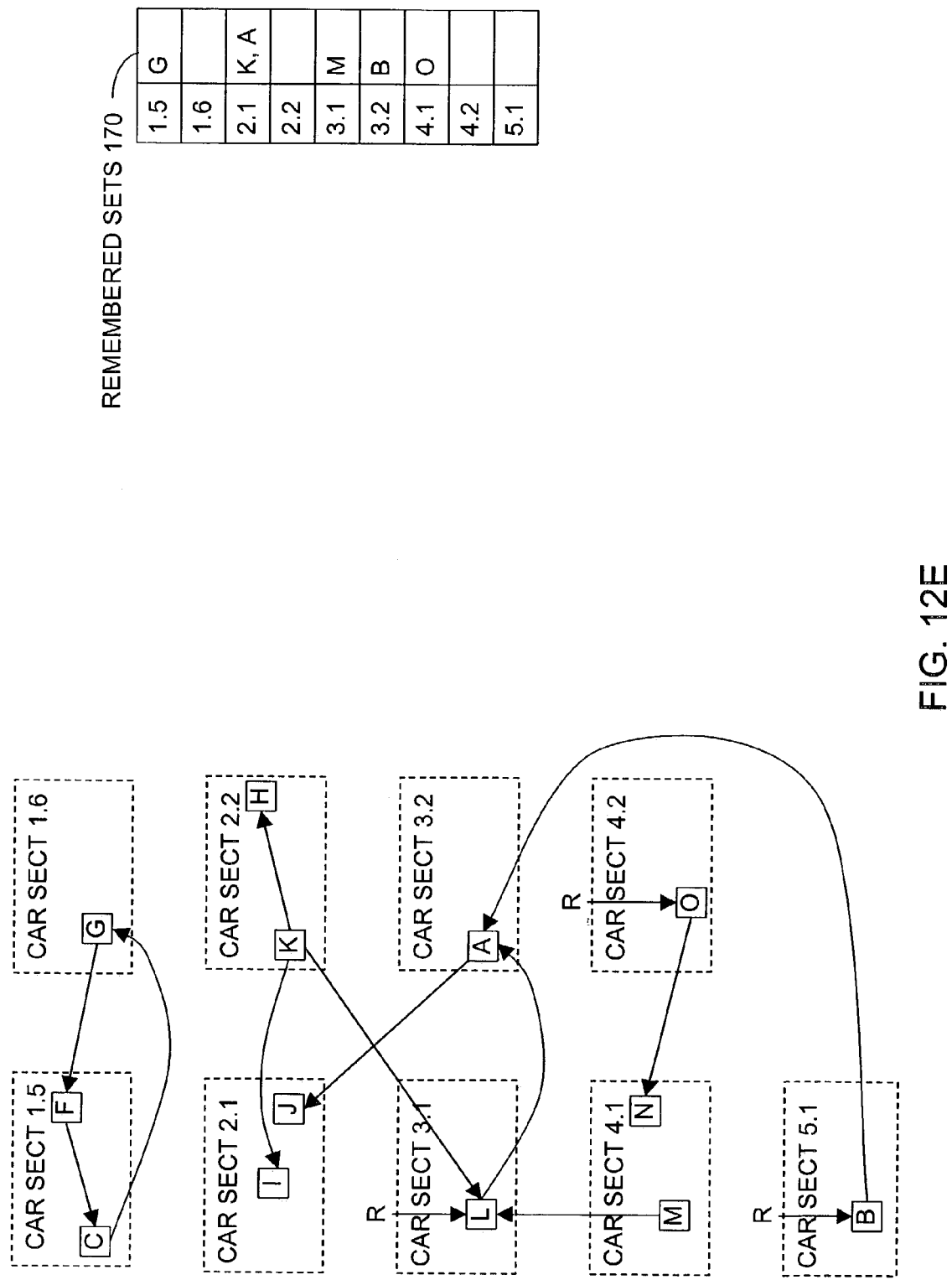
Figure 12F:
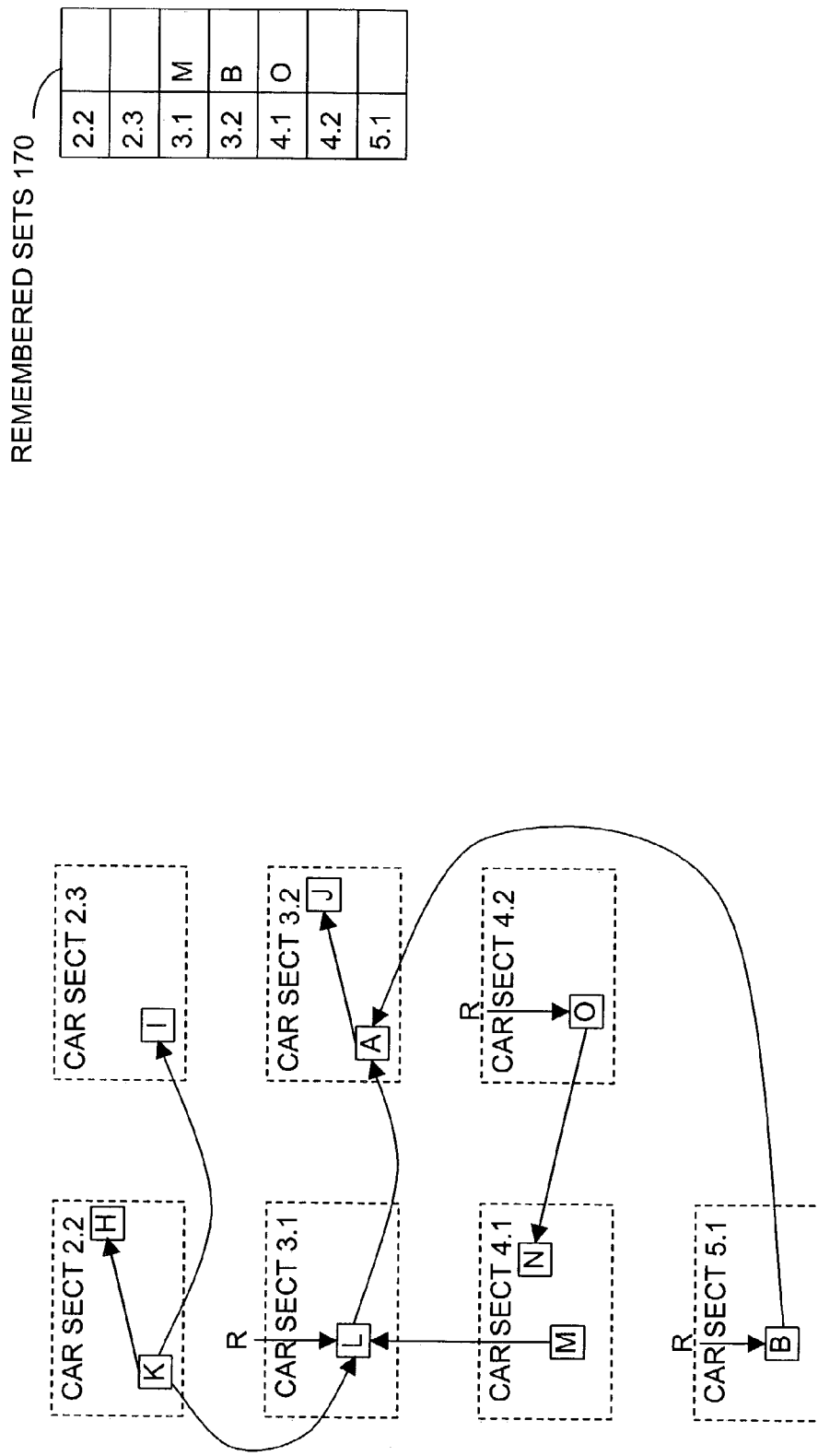
Figure 13:
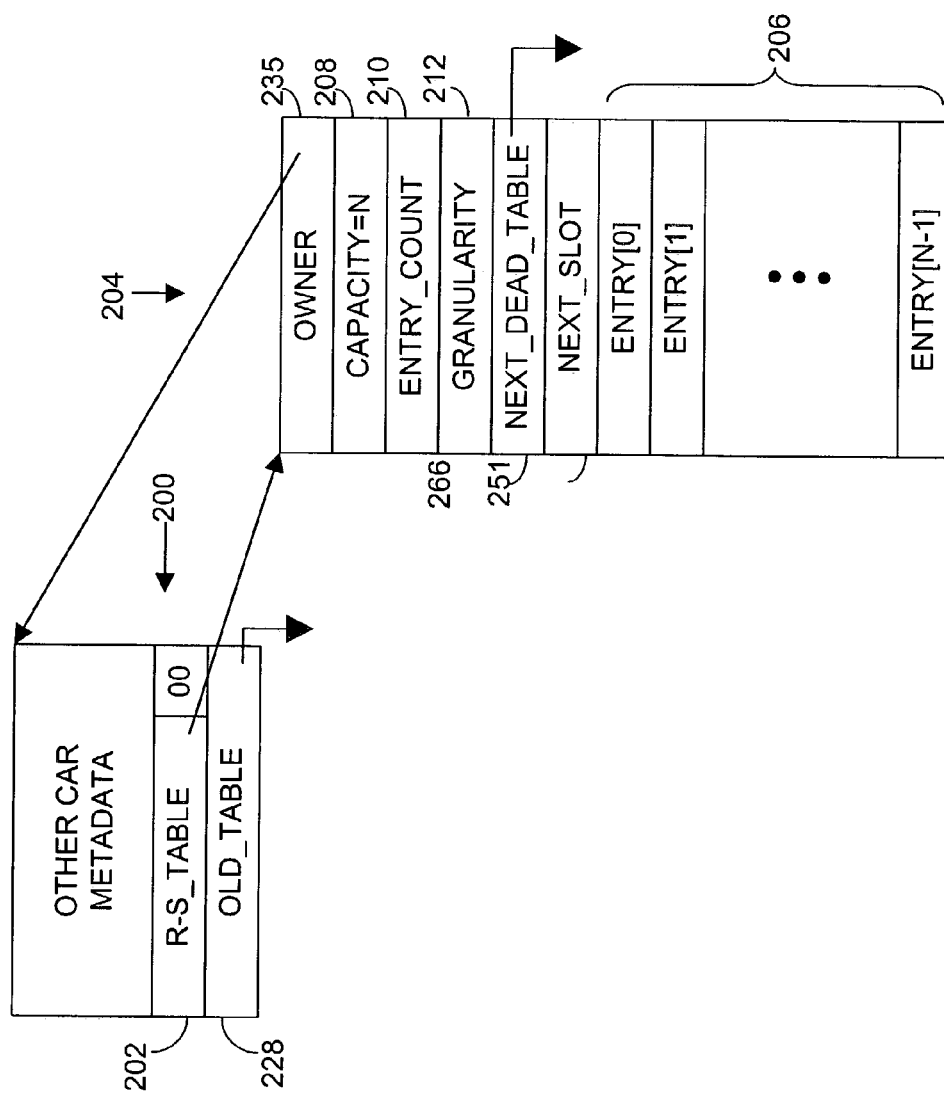
FIG. 13 is a data-structure diagram that depicts structures for containing a car's metadata including its remembered set.

FIG. 13 includes a structure 200 representing metadata used in managing a car section. The metadata will typically include a wide variety of information regarding the car section, but only two of its fields are of interest here. One is field 202. That field contains an identifier of a structure 204 in which are recorded remembered-set entries for that car. Each remembered-set entry represents a region containing at least one location in which the collector has previously found a reference to an object located in the associated car section. Most commonly, the sizes of those regions are only that of a single reference, but they can be bigger, too. The remembered-set structure 204 may simply be an array 206 of entry slots, but it more typically will also include metadata of its own. For example, it may include a field 208 that indicates how big the array is, a field 210 indicating how many entries have already been placed into it, and a field 212 to indicate how large a region each entry is intended to identify.

We assume that the collector is implemented in multiple threads, and we consider a situation in which various threads have been scanning the regions that a card table or other write-barrier mechanism has identified as "dirty," i.e., as having had references modified in them since the last collection interval. When a thread thereby finds a reference, it determines which car the referred-to object is located in, determines where that car's metadata structure is located, and employs the contents of that structure's table-identifier field 202 to locate the remembered-set structure in which to make an entry reflecting that reference's location.

The contents of the table-identifier field 202 can take any form that will effectively identify the remembered-set structure. The particular form it takes in the illustrated embodiment is that of a "tagged" pointer to that structure. That is, its value may differ from a pointer's value in the bits that alignment rules make implicit. For example, if all remembered-set structures are aligned on four-byte words—i.e., if the least-significant bits in a pointer value for such structure must always represent the same value, e.g., $00_2$—then the corresponding bits in the table-identifier field's contents can be used as a tag.

Among other things, that tag indicates whether the structure identified by the remaining bits is being replaced with another structure, presumably one of greater capacity. If the tag's value is simply $00_2$, the collector thread can conclude that no replacement operation is underway. A tag value of $01_2$ indicates that replacement is underway but that the old remembered-set structure's location can be found by simply replacing the tag's value with $00_2$. And a tag value of $10_2$ indicates that replacement is underway and that, as will be explained in more detail below, the identifier's other bits identify a list of insertion records whose contents identify the reference locations that have not yet made it into a remembered-set table.

Figure 14A:
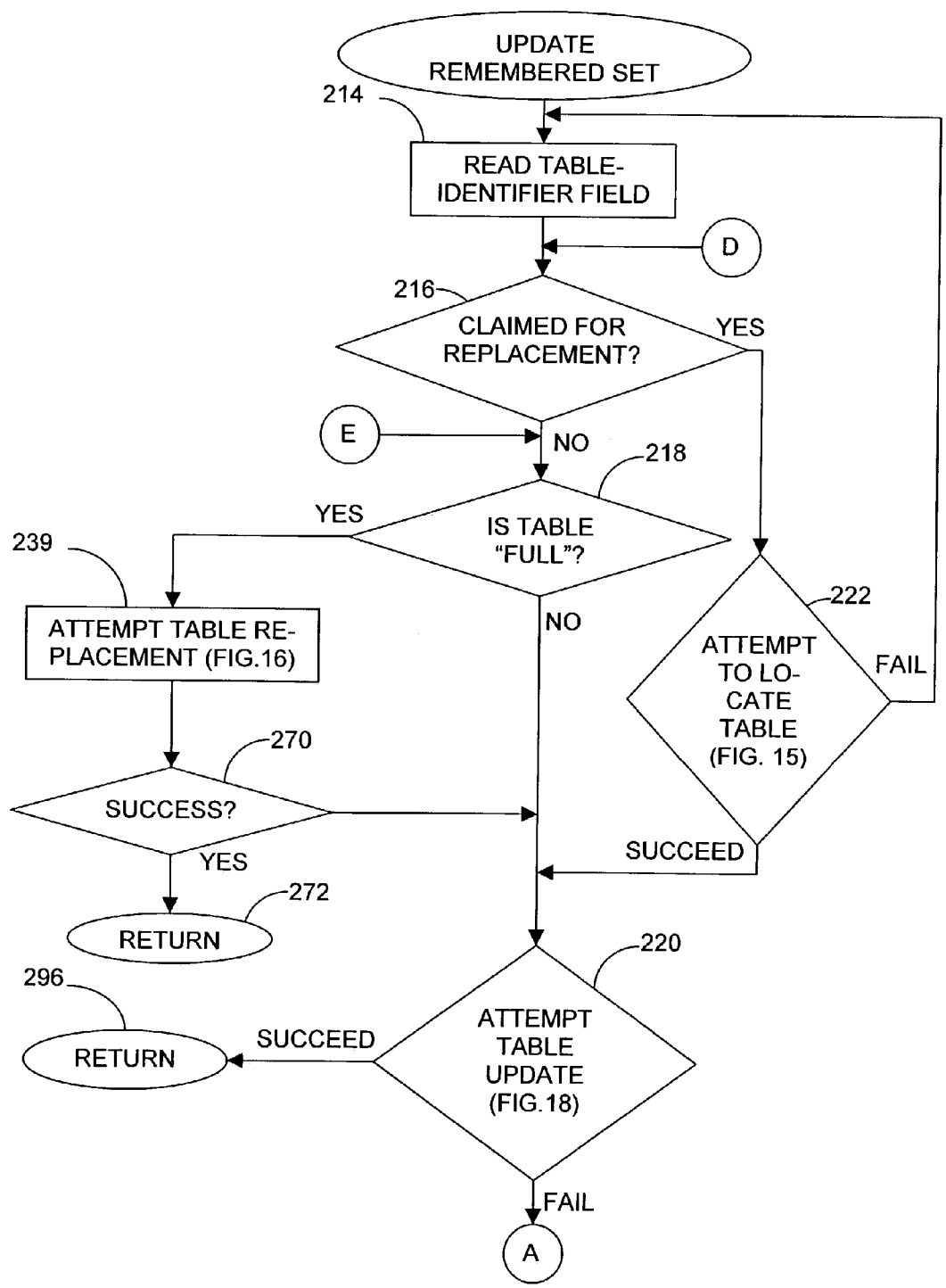
FIGS. 14A, 14B, and 14C together form a flow chart of a routine for updating a remembered-set.
Figure 14B:
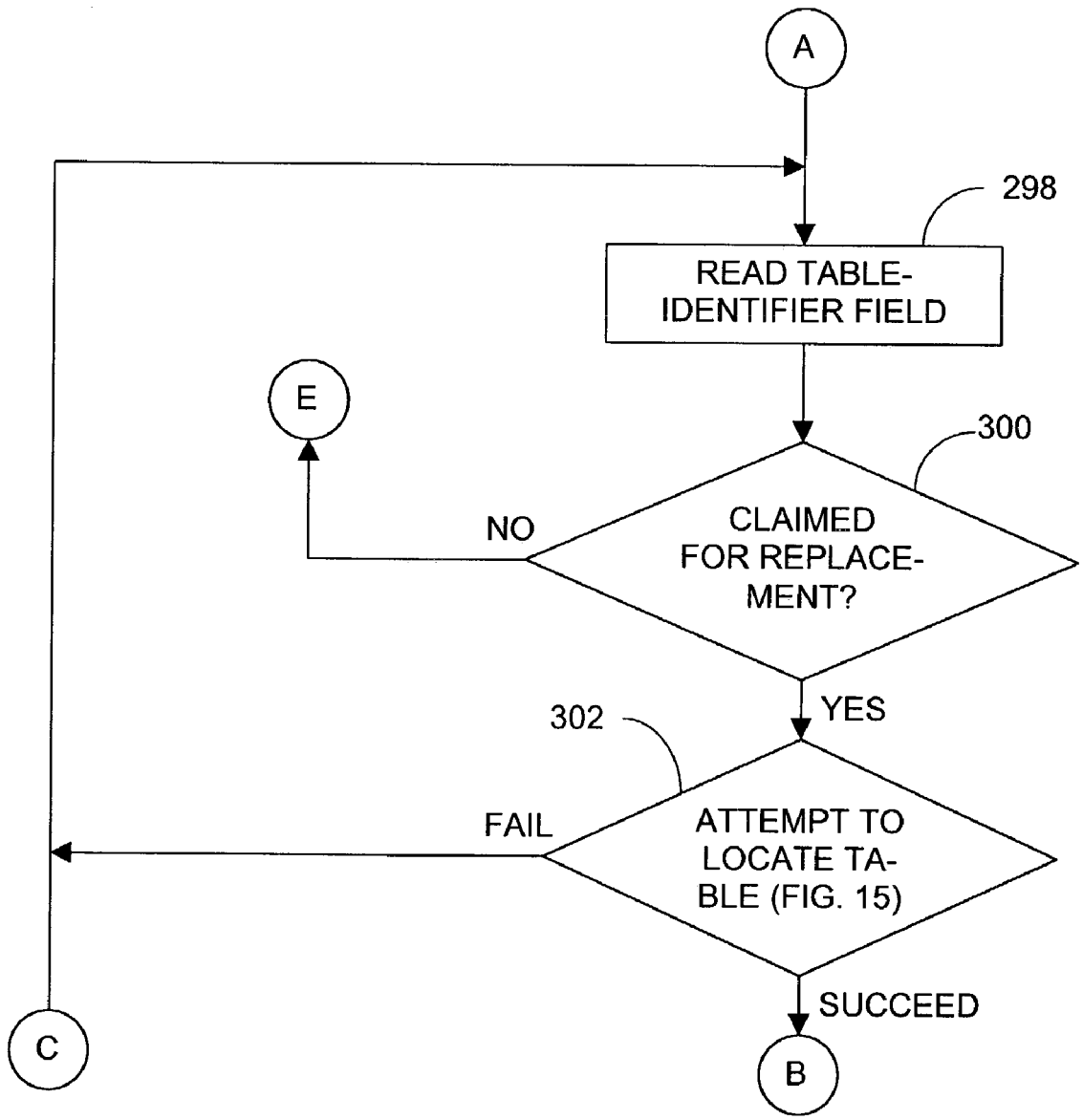
Figure 14C:
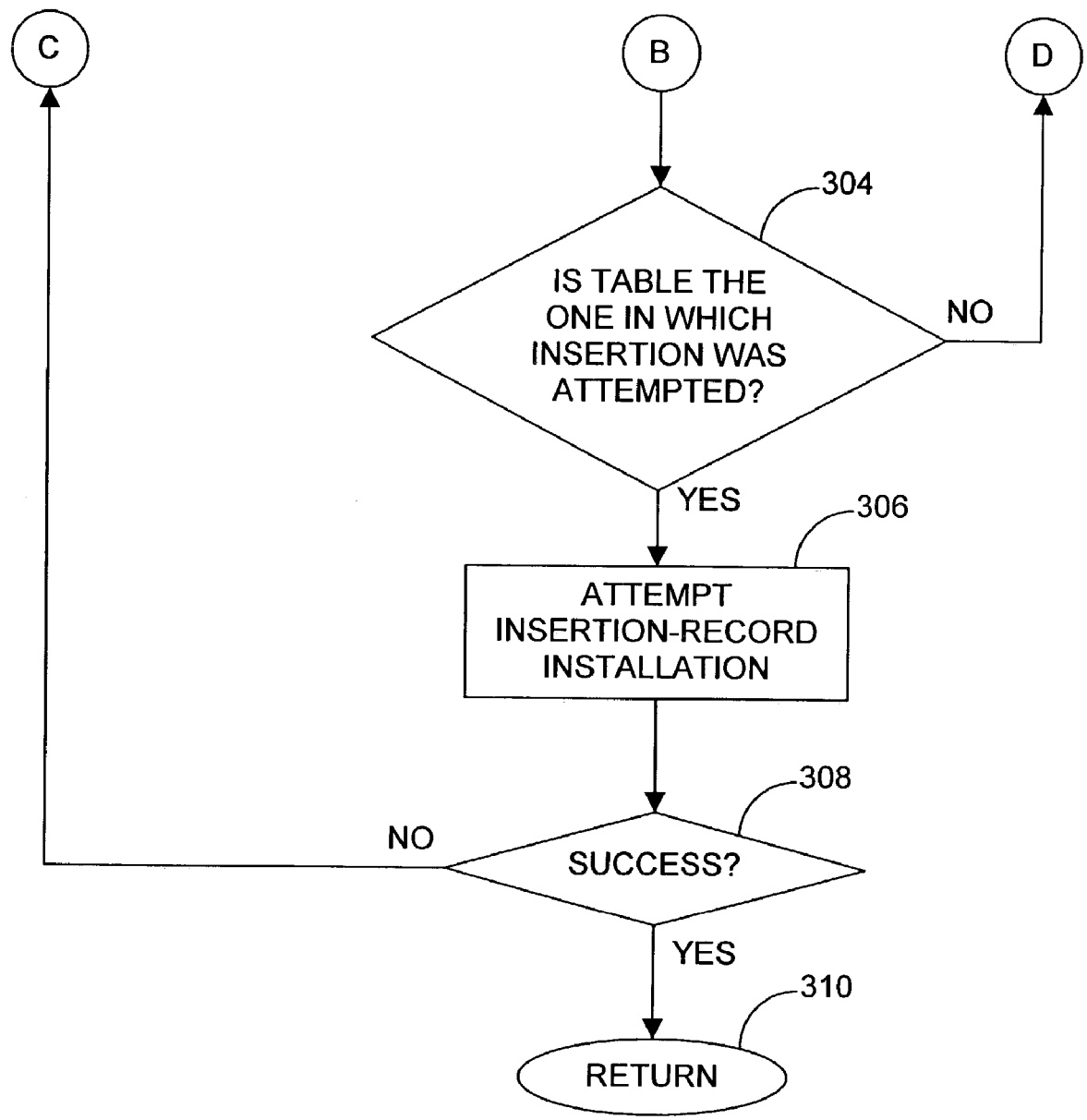

FIGS. 14A, 14B, and 14C (together, "FIG. 14") depict a routine that the thread may employ to update a remembered set in response to having found a reference. Block 214 represents reading the table-identifier field 202, and block 216 represents determining from that field's tag portion whether it has been claimed for replacement, i.e., whether its tag value is $01_2$ or $10_2$ rather than $00_2$.

If the table has not thereby been determined to be in the process of replacement—i.e., if the tag value is $00_2$—then, as blocks 218 and 220 indicate, the thread attempts to make an entry into the table if the table is not already full. The determination of whether the table is already full may be performed, for example, by inspecting the table's capacity and entry-count fields 208 and 210 (FIG. 13). The criterion employed by the collector to decide whether the table is full may simply be whether all of the table slots 206 contain entries. (The contents of a slot that has no entry will typically be some distinguished value such as NULL.) At least if the remembered-set table is implemented as a hash table, though, a table is more typically considered "fill" at some point before all slots contain entries. This is because the task of finding an empty slot in a hash table becomes inordinately expensive when almost all of its slots have entries.

Figure 15:
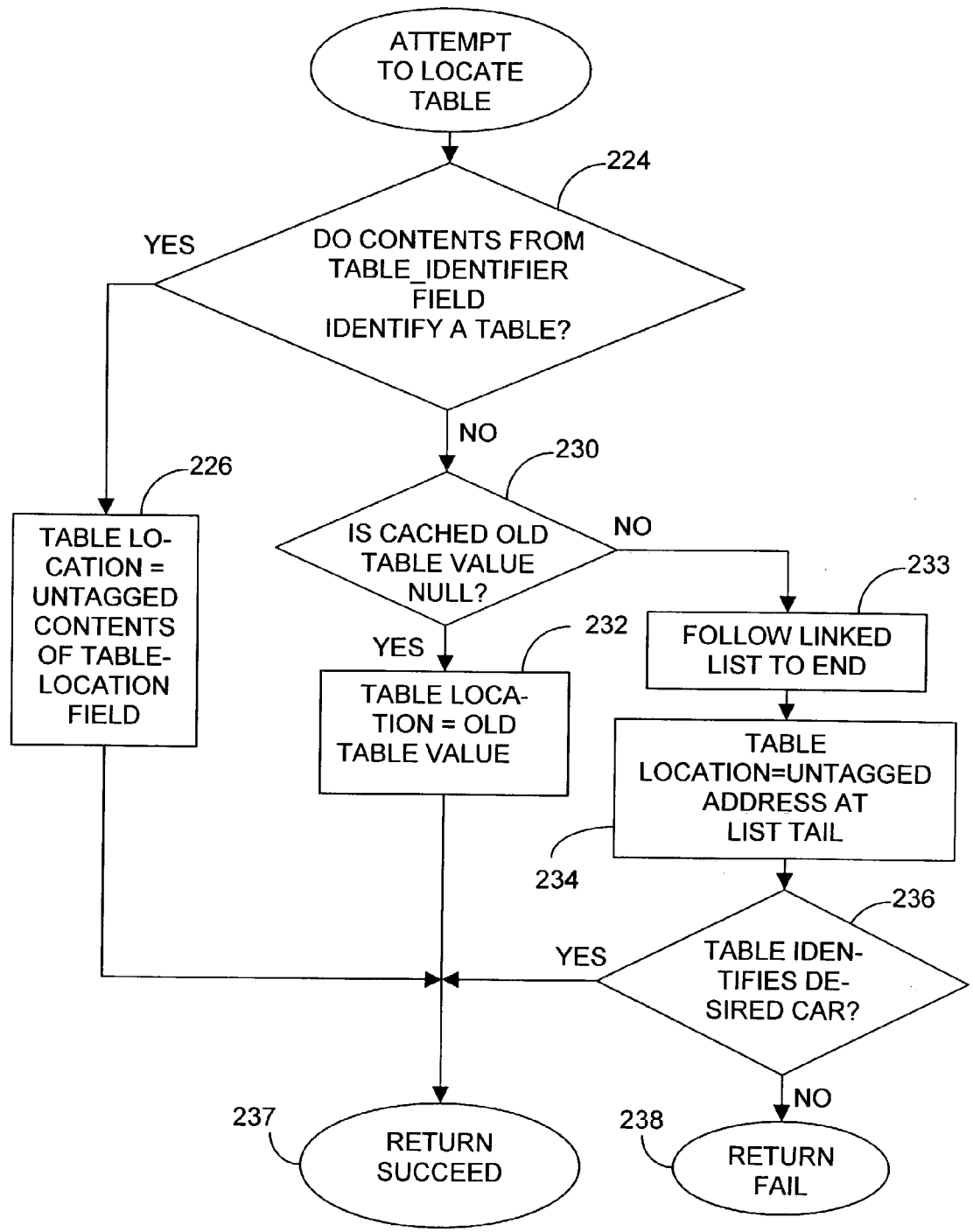
FIG. 15 is a flow chart of a routine for finding the location of a remembered-set table.

The thread needing to make the entry attempts to insert the entry into that table even if the block-216 determination is that another thread has claimed the table for replacement. In that case, though, the contents of the table-identifier field are not a simple pointer to that table, so the thread must perform an operation represented by block 222 to determine the table's location. FIG. 15 depicts that operation in more detail.

In that drawing, block 224 represents determining whether the tag's value is $01_2$, i.e., whether the table-identifier field's most-significant bits are the most-significant bits of a pointer to the table. If the tag has this value, then the table's location can be determined simply by masking out the tag, as block 226 indicates. If the tag instead has a value of $10_2$, then the table-identifier field's contents instead give the location where a linked list starts, as will be explained in more detail below. As will also be explained below in more detail, the thread will be able to determine the table's location by following the linked list to its end.

As FIG. 13 shows, though, the car's metadata structure 200 may additionally include an old-table field 228, in which the thread that is performing the replacement operation may cache a pointer to the table being replaced. In some such embodiments, there may be a (typically brief) interval between a thread's claiming the table for replacement and its placing a pointer to that table into the old-table field 228. For that reason, the routine of FIG. 15 includes an operation represented by block 230. In that operation, the thread determines whether that the old-table field's value is still NULL, which in the illustrated embodiment is the value that the old-table field had before replacement of the car's remembered-set table began.

As block 232 indicates, the thread takes the old-table field's contents as the table location if those contents are not NULL. Otherwise, the thread must follow the linked list, as block 233 indicates. As will be explained below, the linked list's tail will contain the value that was in the table-identifier field when the linked list was first begun: it will contain a tagged pointer to the old table. As block 234 indicates, the thread therefore computes the table's location from that tagged-pointer value at the end of the list.

In some embodiments, the operation of determining the table location may end there. But a feature of the illustrated embodiment necessitates a further test. As will be explained below, the illustrated embodiment allows threads to reclaim insertion records for use in new linked lists after the table-replacing thread has transferred a list's information into a new table. If the table-replacing thread finishes while a thread is performing the block-233 operation of following the linked list to the end, some other thread can reclaim one of the insertion records and place it into a different car's linked list between the time when the link-following thread finds that record and the time when it reads it. If that happens, the table that the list-following thread finds is not the one associated with the car whose table that thread is attempting to locate.

To determine whether it has been thus misdirected, the thread inspects the table to which the list tail directed it. Specifically, it reads the contents of a car-indicating field, which FIG. 13's block 235 represents. If the car thereby identified is the intended one, table-location operation has succeeded, as blocks 236 and 237 indicate. As blocks 236 and 238 indicate, that operation has otherwise failed. The failure branch from FIG. 14A's block 222 indicates that the thread starts over in that case by returning to the block-214 operation of reading the table-identifier field, whose value will have changed.

Figure 16A:
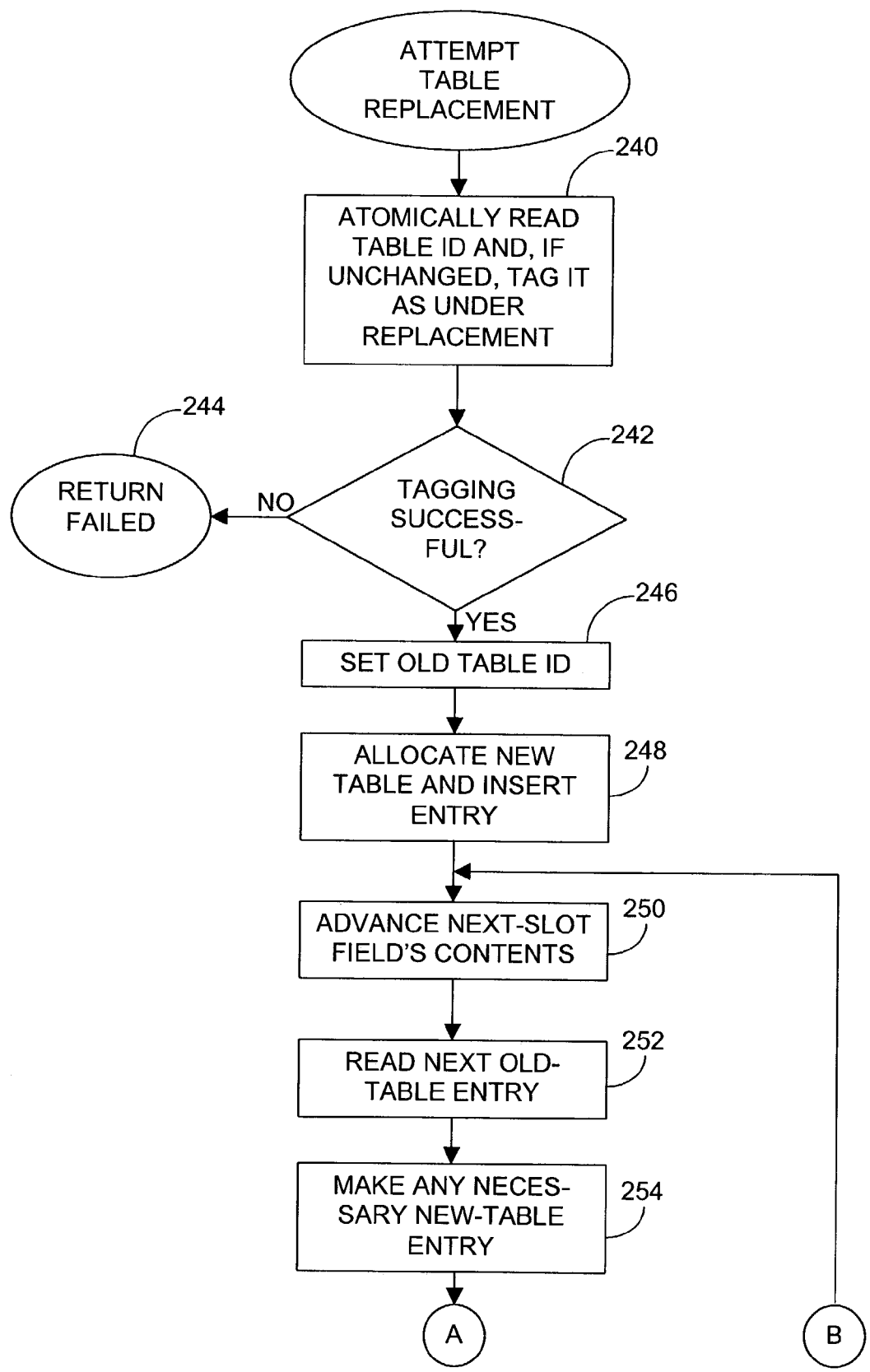
FIGS. 16A and 16B together form a flow chart of a routine for attempting to replace a table.
Figure 16B:
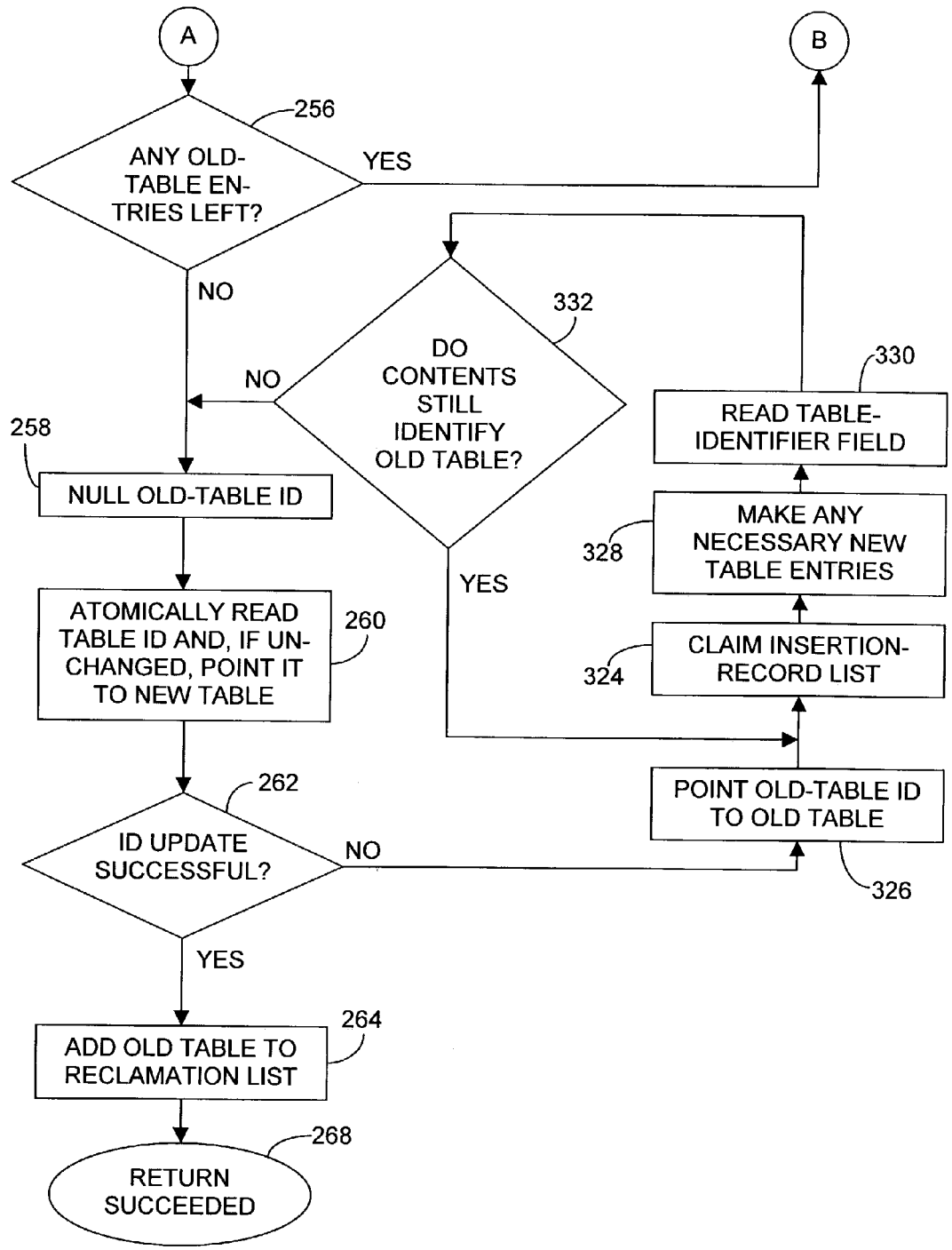

As was mentioned above, the FIG. 14 operation uses the FIG. 15 routine to find the table in those cases in which another thread has claimed the table for replacement. As was also mentioned above in connection with FIG. 14, if the thread instead has not detected another thread's having claimed the table, it performs the block-218 operation of determining whether the table is full. In the illustrated embodiment, the threads that add entries to the remembered set are also the ones that replace tables when necessary. This is not a necessary feature of the present invention; different threads could be dedicated to the different functions, for example. But whichever thread or threads perform table replacement will use the block-218 criterion or some other to determine whether to replace the remembered-set table. Block 239 represents the operation of attempting that replacement, and FIGS. 16A and 16B (together, "FIG. 16") illustrate that operation in more detail.

That operation's first step, represented by block 240, is to perform an atomic operation in which the table-identifier field is read and, it if it still identifies the same table and indicates that the table has not been claimed by some other thread for replacement, replaced. Most modem processor architectures provide instructions for thus performing operations atomically that are otherwise performed separately. An example of such an operation is the compare-and-swap operation, whose arguments are a target address, an lo expected value, and a replacement value. The compare-and-swap operation atomically (1) reads the contents of the target address, (2) compares them with the expected value, and (3) if the contents thereby read equal the expected value, replaces those contents with the replacement value. If the contents thereby read do not equal the expected value, then no such replacement occurs: the compare-and-swap operation fails.

Figure 17:
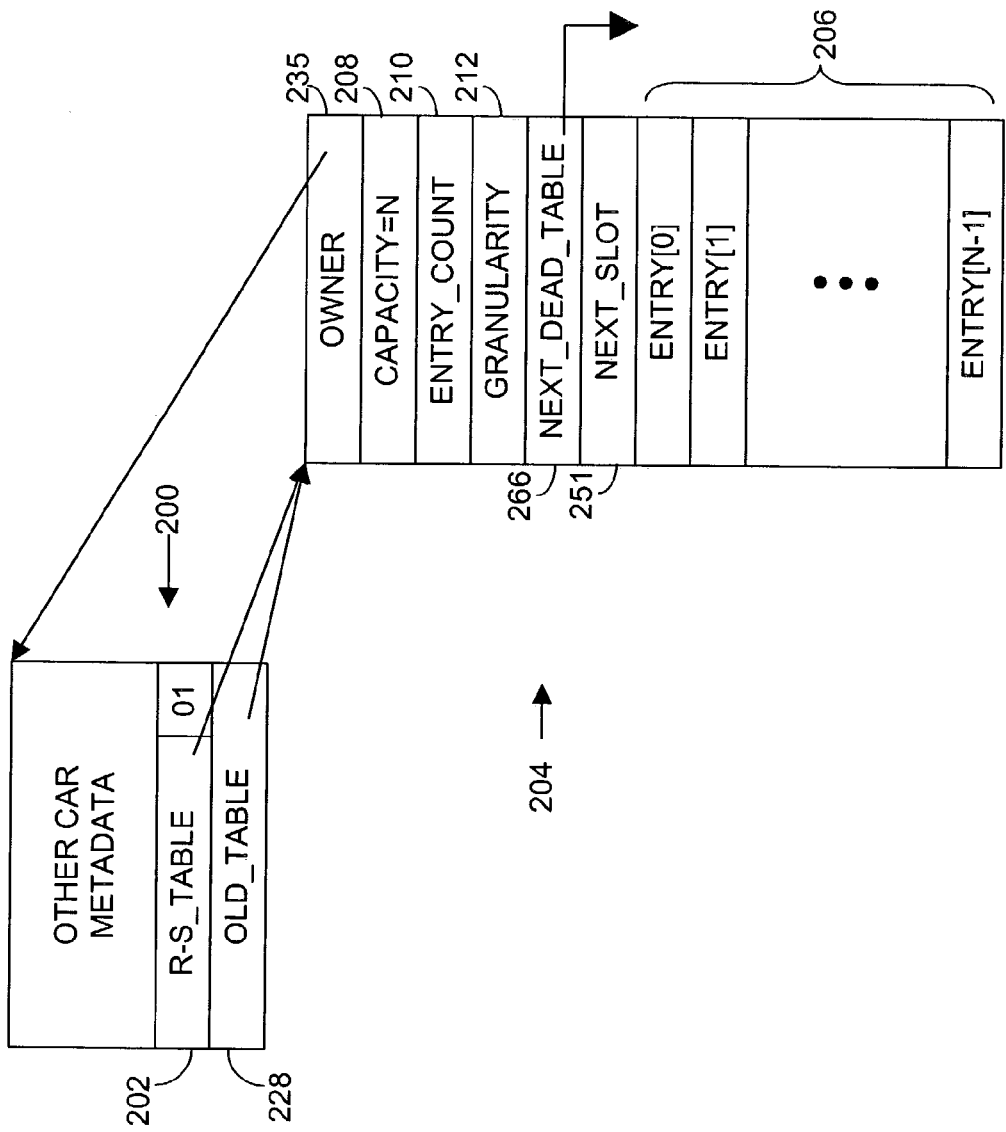
FIG. 17 is a data-structure diagram similar to that of FIG. 13 but showing the result of a table's having been claimed for replacement.

In the block-240 operation, the expected value is the one that was read from the table-identifier field in the operation that FIG. 14's block 214 represents. So the atomic operation of block 240 will fail if that field's contents have changed since then. Such a change occurs only if another thread has claimed the table for replacement in the interim. So an embodiment that dedicates only a single thread to table replacement does not need to use atomic operations to claim the table. In the illustrated embodiment, though, the atomic operation is needed, because another thread could have claimed the table. As blocks 242 and 244 indicate, the FIG. 16 routine returns a failure-indicating value if one has. If the operation succeeds, on the other hand, embodiments that employ an old-table field (FIG. 13's field 228) will place in it a pointer to the table, as FIG. 16's block 246 indicates. FIG. 17 depicts the resultant state. It illustrates that the tag value is now $01_2$ and that the old-table pointer 228 now points to the old table.

The thread then embarks on the process of replacing the table. To this end, it first allocates a new table and places in it an entry representing the location of the reference whose discovery caused the thread to invoke the FIG. 14 routine. FIG. 16's block 248 represents this operation.

Next the thread places entries in the new table that represent the locations identified by entries in the old table. Before the thread considers each old-table entry for this program, it updates a next-slot field 251 (FIG. 13) in the old table 204 to identify the slot after the one about to be considered. As will be seen, other threads use this value to determine whether they have effectively added an entry to a remembered set undergoing table replacement. The expense of thus updating the next-slot field 251 can be reduced by advancing that field's value by N>1 so that advancement is required only every $N^{th}$ time a new slot is considered.

Ordinarily, the new table is larger than the old table, and the operation represented by the loop of blocks 250, 252, 254, and 256 simply involves placing entries into the new table that are identical to those contained in the old table, although the placement would typically be performed in accordance with a different hash function, one having a larger range. In some cases, though, the entries will be different because the new table's entries are to be interpreted as identifying larger regions: the granularity with which the new table's entries specify locations is coarser than that with which the old table did. In such a situation, the new table will not necessarily be bigger than the old table, and there will not necessarily be a one-to-one relationship between old-table entries and new-table entries, because a single entry in the new table may identify a region that encompasses locations represented by more than one old-table entry. In any event, atomic operations need not be used in performing the block-254 step of adding entries to the new table; since the table-replacing thread has not yet placed an identifier of the new table into the car's table-identifier field, no other thread yet has access to the new table.

After the thread has considered all of the old table's entries, it returns the old-table field's contents to NULL, as block 258 indicates. In an operation represented by block 260, it then employs an atomic compare-and-swap operation to place a pointer to the new table into the table-identifier field. If that operation succeeds, the thread has successfully installed the new table as the one associated with the remembered set. So, as blocks 262 and 264 indicate, the thread in that case places the old table into a linked list of tables whose memory will be reclaimed at the end of the collection increment's remembered-set-updating phase. To support the linking of that dead-table list, the table may include a field 266 (FIG. 13) whose contents point to the next dead table. As FIG. 16's block 268 indicates, the table-replacement routine then returns a value indicating that the table replacement was successful. The overall entry-insertion routine then returns, as FIG. 14's blocks 270 and 272 indicate.

However, FIG. 16's block-260 atomic operation of updating the table-identifier field's contents to point to the new table does not always succeed. The reason for this can be appreciated best by returning to FIG. 14 and considering the operations that are performed by a thread that is attempting to make a remembered-set entry into a table currently being replaced. As was mentioned above, such a thread performs the block-222 operation of finding the table, and it then performs the block-220 operation of attempting to update the table by making an entry into it.

Figure 18A:
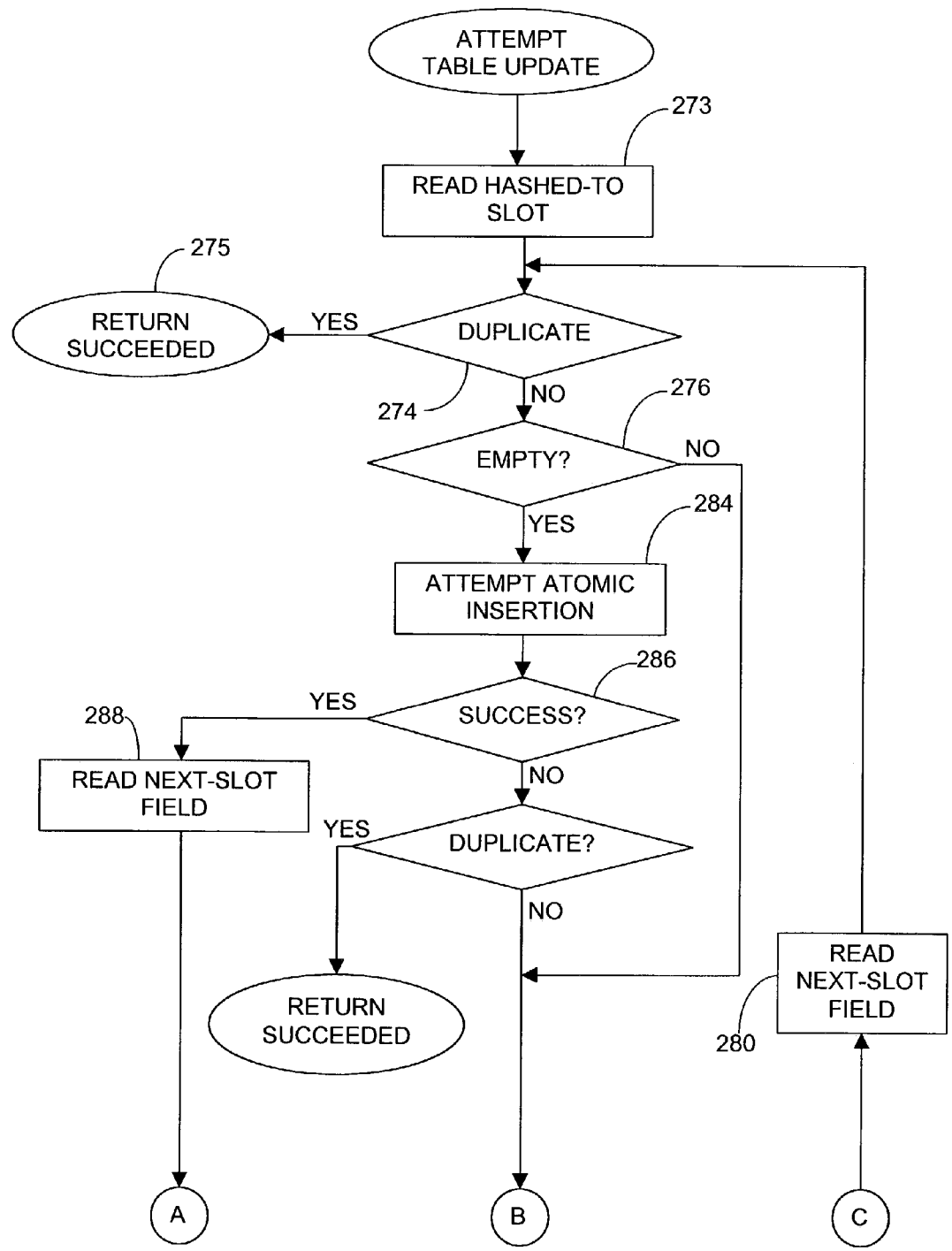
FIGS. 18A and 18B together form a flow chart of a routine for attempting to insert an entry into a remembered-set table.
Figure 18B:
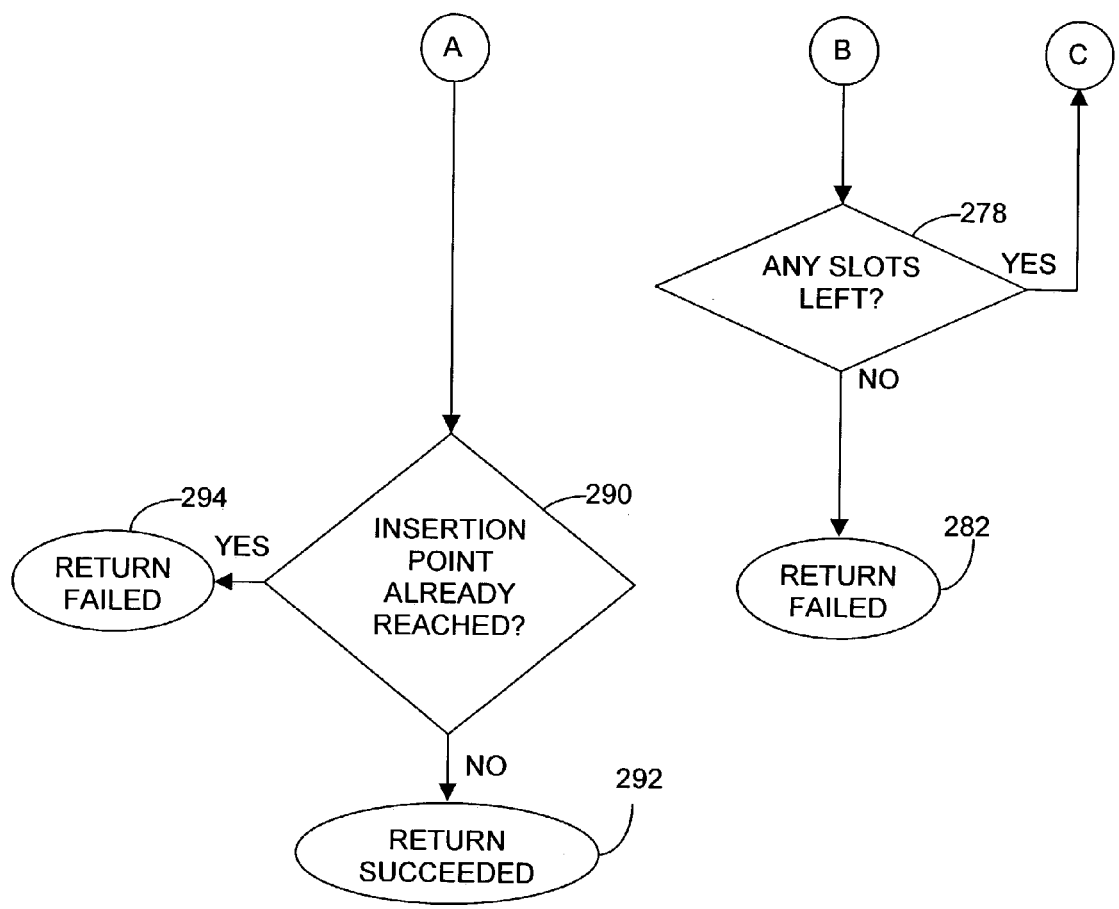

FIG. 18 depicts the latter operation in more detail. The operation begins with selecting a target slot in which to place the new entry. The placement rule used for this purpose will be different for different types of remembered-set table. In some tables, for is instance, the placement rule may simply be to place the entry into the slot immediately after the one that received the last entry. Since it is highly beneficial to avoid duplicates in remembered-set tables, though, most remembered-set tables will be implemented as hash tables. In hash tables, the placement rule is based upon the value being stored. Specifically, a hash function is applied to the proposed contents, and the result is the index of the first candidate target slot.

Although other types of structures could be used instead, the illustrated embodiment employs a hash table of the open-address variety. As FIG. 18's block 273 indicates, the table-update operation's first step is therefore to read the table slot to which the reference-location identifier (typically the address) of the reference to be recorded hashes. If that slot already contains the location identifier for that reference, the operation has found its target slot, and, as blocks 274 and 275 indicate, the table-update operation is considered successfully completed.

If that slot is neither empty nor contains the intended location identifier, some other slot is sought in accordance with the placement rule's search order. For the sake of simplicity, we assume that the rule in this case is simply to proceed in (circular) index order until an empty slot is found. So blocks 276, 278, and 280 indicate that the thread reads the next slot if there are any that it has not yet read. As block 282 indicates, the attempted insertion fails if that routine has run out of slots. Otherwise, the thread continues reading further slots until it finds an empty one. It then employs an atomic operation, as block 284 indicates, to insert a value into that target slot. That is, it atomically (1) reads the target slot's contents and (2) if the slot is still empty, places the intended value into it. If that atomic operation is successful, the thread has written the intended value into the table without overwriting a value written there by some other thread.

Now, some other thread may be in the process of replacing the table into which the thread first made an entry. And that other thread's operation of transferring information from the old table to the new table may already have passed the slot where the new entry was made. If so, the entry just made was not effective: the table-replacing thread will not make the new table reflect that entry, so the insertion into the old table did not add anything to the remembered set.

To check for this possibility, the thread proceeds to the step represented by block 288, in which it reads the table's next-slot field 251 to determine how far along in its transfer process any thread replacing the table may be. If no thread is replacing the table—or if a thread replacing the table has not yet begun the transfer process—the next-slot field will contain a value, zero, indicative of that fact. Otherwise, its value will identify a table slot that the transfer operation has not yet reached. If it has not yet progressed to the slot where the entry-inserting thread has made its entry, that thread can conclude that the entry it just made will be reflected in any replacement table. And, as blocks 290 and 292 indicate, the routine has successfully completed the insertion operation in that case. As blocks 290 and 294 indicate, on the other hand, insertion into the table has failed if the table-replacing thread has reached the slot into which that entry was written.

As FIG. 14A's block 296 indicates, the overall insertion operation is finished if the insertion into the old table succeeded. Otherwise, the thread that was attempting to make the insertion still needs to record the location of the reference it found. If the table currently associated with the remembered set is not in the process of being replaced, the thread can make progress either by replacing the table itself or by placing an entry into a table with which another thread replaced the previous one. So it returns to the operation represented by FIG. 14A's block 218 if, in operations represented by blocks 298 and 300, it infers from the contents of the table-identifier field that table replacement is not currently underway.

If it instead infers that a table replacement is indeed currently underway, the thread nonetheless avoids waiting for the table replacement to be completed. As will shortly be seen, one way of doing so is to place a reference-location identifier in an "insertion record" and place that record into a list of tasks that the table-replacing thread will perform when it finishes transferring entries from the old table. Now, the thread should not perform such an insertion-record installation if the table currently being replaced is not the one into which insertion failed. As blocks 302 and 304 indicate, it instead tries to make a table entry in that case, at least if it successfully identifies the proper table. More frequently, though, it performs the block-306 operation of attempting to associate the insertion record with the remembered set, in a manner shortly to be explained. If that attempt is successful, the thread returns from the remembered-set-update routine of FIG. 14, as blocks 308 and 310 indicate, to continue its search for further references.

Figure 19:
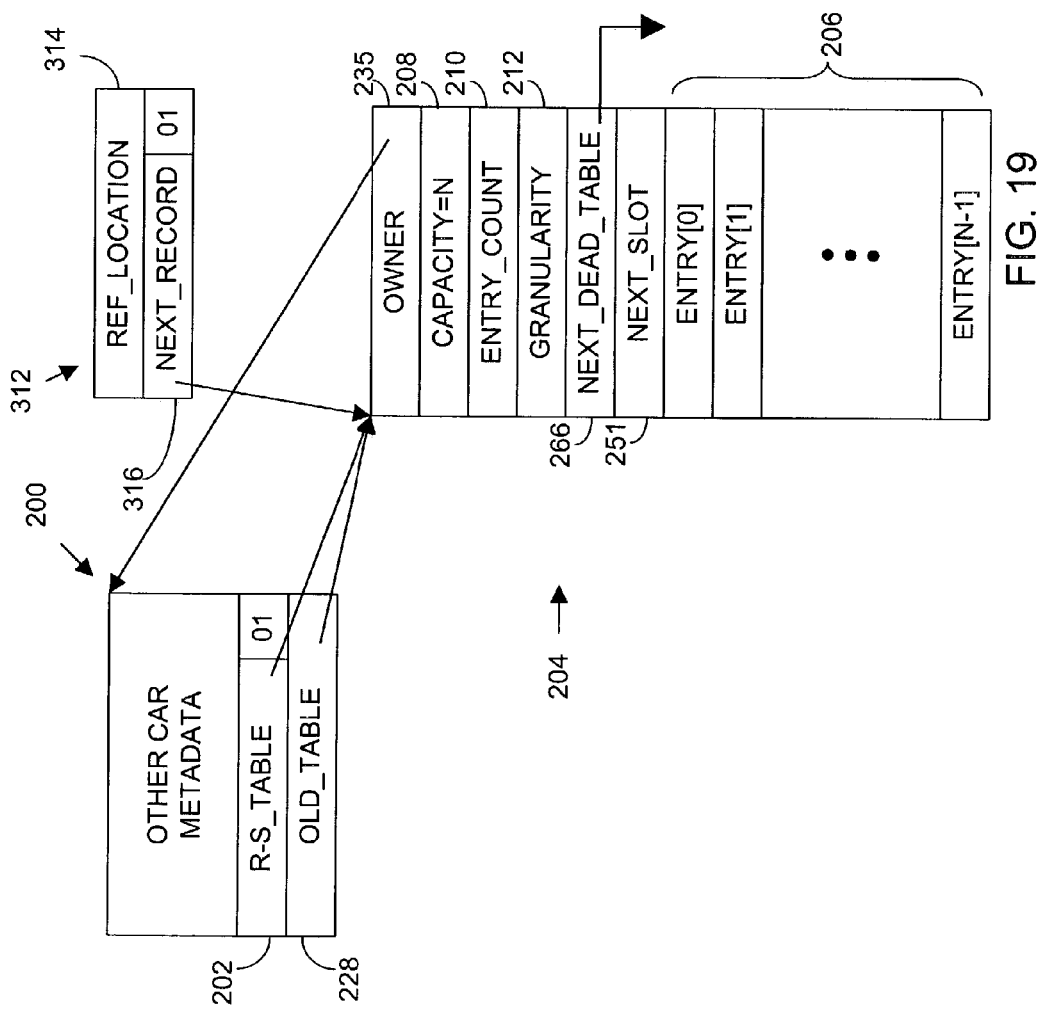
FIG. 19 is a data-structure diagram similar to that of FIG. 13 but additionally depicting an insertion record.

The insertion-record-installation operation that block 306 represents involves linking into a linked list an insertion-record structure typically drawn from a per-thread pool of such structures. In FIG. 19, reference numeral 312 refers to such a structure. No thread other than the one associated with that pool has access to that structure until that thread has placed the structure into a car's linked list, in a manner that will now be described.

To add an identifier of the reference's location to the car's insertion-record list, the thread first creates an insertion record by writing an identifier of the reference's location into the insertion-record structure 312's reference-location field 314. It then writes into that structure's second field 316 the contents of the car's table-identifier field 202. As FIG. 19 shows, this will result in that record's identifying the old table 204 if no thread had previously started a linked insertion-record list for that car.

With the insertion record thus prepared, the thread then attempts to insert it into the linked list by atomically writing into the car's table-identifier field a value that both gives the insertion record's location and identifies it as an insertion record rather than a remembered-set table. Specifically, it writes into that field the value that results from replacing the two least-significant bits of that record's address with 10$_2$. That atomic operation may not succeed. For example, another thread may have installed its own insertion record and thereby made the table-identifier field's contents differ from the expected value, the one that the thread had previously read in that field. As FIG. 14 indicates, this will cause the thread to try again.

Figure 20:
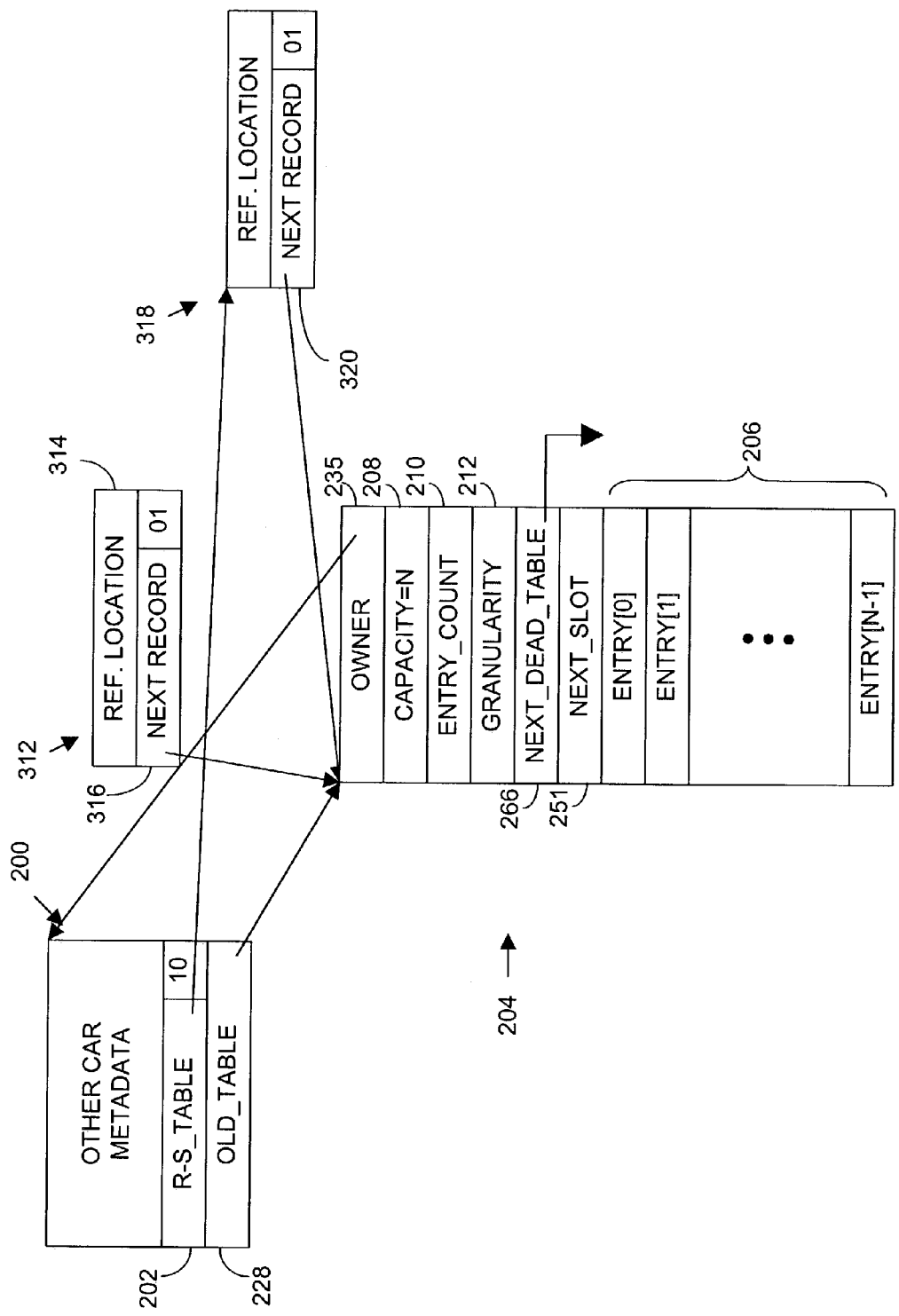
FIG. 20 is a data-structure diagram similar to that of FIG. 19 but additionally depicting a second insertion record linked into a list associated with the car.

For the sake of example, let us assume that the thread that had created record 312 was initially unsuccessful at linking it into the list. Let us further assume that this was to because another thread had interfered with the first thread's insertion-record installation by placing into the insertion-record list an insertion record from its own insertion-record pool. FIG. 20 shows an additional insertion record 318, the tag value of whose next-record field is $01_2$, indicating that it identifies the location of a remembered-set table and is therefore the last insertion record in the list. (In this example, of course, it is also the first.)

Figure 21:
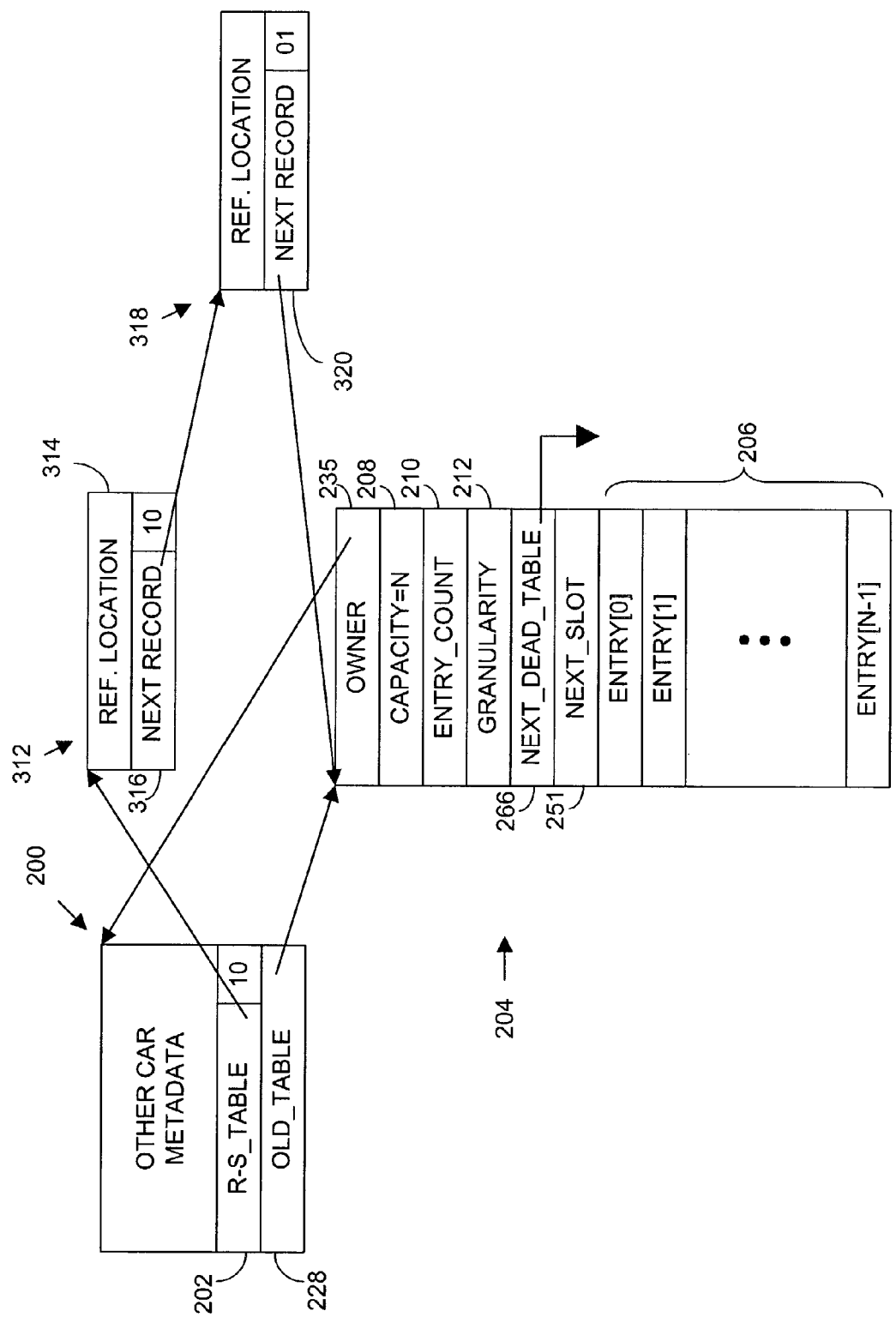
FIG. 21 is a data-structure diagram similar to that of FIG. 20 but depicting the first insertion record as linked into that list.

As FIG. 20 shows, the previously unsuccessful thread finds an identifier of record 318 when, in the step represented by FIG. 14B's block 298, it again reads the table-identifier field 202. It therefore places that identifier in its next-record field 316, complete with the tag value of $10_2$ to indicate that the location thereby identified is an insertion record. It then again attempts, in an atomic operation represented by FIG. 14C's block 306, to install into the table-identifier field 202 a value that identifies its own record's location as that of the first insertion record in the list. If it is successful, the result is as FIG. 21 illustrates. And, as FIG. 14C's blocks 308 and 310 indicate, it has completed its insertion operation. If it fails, the reason for the failure is either that another thread inserted a record into the list or, as will be seen presently, that the table-replacing thread has removed that list for processing. In both cases, it tries again.

Having now observed the operation of adding an insertion record, we return to FIG. 16's block 262, which represents an operation performed by a table-replacing thread that has already transferred the old table's entries into the new table and has attempted to install the new table by updating the car's table-identifier field to identify that table. In this operation, the thread determines whether the atomic operation it performed for that purpose was successful. If it was not successful, the reason why is that another thread had placed an insertion record into its list, in the manner just described. So the thread infers from such a failure that it needs to make the new table reflect the linked list's entries.

As block 324 indicates, it therefore returns the contents of the old-table field to a value that identifies the old table. As block 326 indicates, it then claims the insertion-record list. It does this by atomically writing into the car's table-identifier field the value that identifies the old table and indicates that it is undergoing replacement. As was explained in connection with FIG. 14's blocks 306 and 308, this prevents other threads from adding further insertion records to that list (although they may start new ones).

Of course, the atomic operation employed to claim the list may initially fail, but the table-replacing thread will simply keep trying it until it succeeds. When it does, it will have read the location of the list head, but it still will not have replaced the table, so the other threads still will have no access to the new table. The table-replacing thread therefore does not need to use expensive atomic operations to perform the block-328 operation of placing insertion-record entries into the new table.

Part of the new-table-updating operation that FIG. 16's block 328 represents is to write a NULL value into each insertion record that the table-replacing thread has read. The table-replacing thread does this to free the record for re-use. Each thread will typically maintain a linked list of the insertion records located in its insertion-record pool that are free to be used. It is from this free list that it draws records to be added to various cars' insertion-record lists. When its free list runs out, the thread scans its pool for records that table-replacing threads have nulled, and it places those nulled records into its free list.

When the table-replacing thread has completed making updates to a car's new table in response to the contents of the insertion-record list, it reads the car's table-identifier field, as block 330 indicates. As block 332 indicates, it then determines whether that field's value still identifies the old table. If it does not, then some thread has begun a new linked list of insertion records, and the table-replacing thread returns to the operation represented by block 326: it claims that linked list, too.

Figure 22:
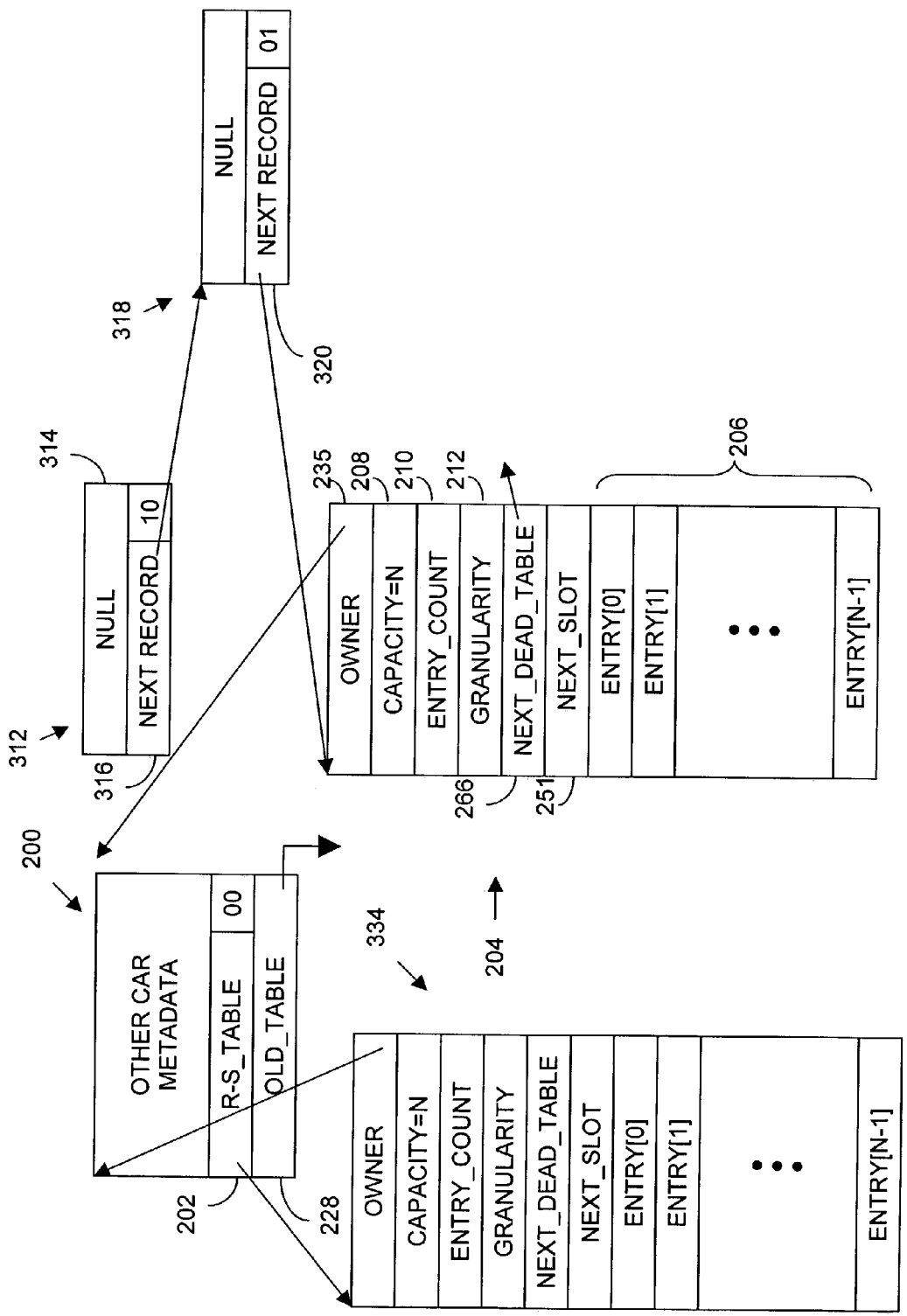
FIG. 22 is a data-structure diagram similar to that of FIG. 21 but depicting the result of installing a new remembered-set table.

This continues until, having completed updating the new table in response to an insertion-record list, the thread finds that no further insertion-record lists have been added. When this happens, the thread again nulls the old-table field 288 (FIG. 13), as block 258 indicates, and again performs the block-260 operation of attempting to redirect the table-identifier field 202's contents to the new table. If it is successful this time, it completes the table-replacement routine by, as was explained above, performing the block-264 operation of placing the old table on the reclamation list and performing the block 268 operation of returning a value indicating that it has succeeded. As FIG. 14's blocks 270 and 272 indicate, this completes the overall entry-insertion operation. FIG. 22 depicts the result, showing a new table 334 installed as the one associated with the car section that the collector uses metadata 200 to manage.

Thus employing insertion-record lists enables a multi-threaded garbage collector to avoid the bottlenecks that replacement of remembered-set tables can otherwise cause. The present invention therefore constitutes a significant advance in the art.

What is claimed is:

1. A method of garbage collection comprising:
   A) providing a computer system that includes memory and executes a mutator that modifies references in a dynamically allocated heap in the memory;
   B) configuring the computer system to act as a garbage collector that:
      i) scans at least some of the heap for references;
      ii) treats at least a portion of the heap as divided into heap sections with each of at least some of which the garbage collector associates a respective remembered set of reference-location identifiers, recorded in respective slots in a remembered-set table associated with that remembered set and thereby with that heap section, that identify regions where references to objects in that heap section have been found;
      iii) executes in a plurality of garbage-collector threads a remembered-set-maintenance operation in which:
         a) at least one of the garbage-collector threads performs a table-replacement operation, which, for a given remembered-set table, includes:
            (1) an old-table-transfer operation, in which reference-location identifiers that identify regions containing all locations contained in regions identified by the reference-location identifiers in the remembered-set table, denominated the old remembered-set table, that is associated with a given remembered set are placed into a new remembered-set table; and
            (2) a table-installation operation, in which the old remembered-set table is replaced with the new remembered-set table;
         b) at least another one of the garbage-collector threads performs a reference-recording operation, which, for a given reference to an object in a given heap section, includes:
            (1) in at least some instances in which the given heap section is currently being replaced by a different garbage-collector thread, performing at least one table-access operation, in which a target slot chosen in accordance with a placement rule is accessed;
            (2) at least if that remembered-set table is not currently undergoing replacement, making a table-update attempt, in which an attempt is made to place a table-location identifier into the target slot if necessary to ensure that the given reference's location is included in a region identified by a reference-location identifier in that remembered-set table;
            (3) in at least some instances, making a replacement-status determination, in which a determination is made of whether that table is currently undergoing replacement;
            (4) in at least some instances in which the replacement-status determination is affirmative, performing a record-addition operation, which includes placing an insertion record containing such a reference-location identifier into an insertion-record list associated with the given heap section; and
            (5) refraining from performing a record-addition operation if the replacement-status determination is negative; and
         c) if an insertion-record list is associated with the given remembered set, the table-replacement operation includes performing a record-transfer operation, in which, for each reference-location identifier contained in an insertion record in such an insertion-record list, a table-location identifier is placed in the new table if necessary to ensure that the regions identified by the reference-location identifiers in the new table include the region identified by the reference-location identifier contained in that insertion record;
      iv) employs the remembered sets thereby maintained to identify potentially reachable objects;
      v) reclaims memory space occupied by objects not identified as potentially reachable; and
   C) employing the computer system to execute the garbage collector.

2. A method as defined in claim 1 wherein, for at least one said garbage-collector thread, the remembered-set-update operation:

A) is performed in response to finding a given reference to an object in a given heap section; and
B) includes:
  i) at least if the remembered-set table associated with the given reference is not already being replaced, making a replacement-requirement determination, which comprises determining whether that remembered-set table satisfies a replacement criterion;
  ii) at least in some instances in which the replacement-criterion determination is affirmative, performing the table-replacement operation for that table; and
  iii) if the replacement-criterion determination is negative:
    a) refraining from performing the table-replacement operation for that table; and
    b) in at least some instances, performing the reference-recording operation for the given reference.

3. A method as defined in claim 2 wherein the table-replacement operation includes placing into the new remembered-set table a reference-location identifier if necessary to ensure that the given reference's location is included in a region that is identified by a reference-location identifier in that remembered-set table.

4. A method as defined in claim 1 wherein:
A) at least if the remembered-set table associated with the given heap section is currently being replaced by another thread, the table-update attempt includes a duplicate-finding attempt, which includes at least one said target-access operation, in which the target slot is read to determine whether it contains a reference-location identifier identifying a region containing the object to which the given reference refers;
B) the duplicate-finding attempt succeeds if the target slot is thereby determined to contain such a reference-location identifier;
C) the duplicate-finding attempt otherwise fails; and
D) the table-update succeeds if the duplicate-finding attempt succeeds.

5. A method as defined in claim 1 wherein:
A) the garbage collector associates a respective table-identifier field with each of at least some of the remembered sets;
B) when a remembered-set table associated with a given remembered set is not undergoing replacement, the table-identifier field associated with the given remembered contains a value that the garbage collector interprets as identifying that remembered-set table and as indicating that it is not undergoing replacement;
C) the table-replacing thread commences a table-replacement operation by performing a table-claim operation in which the contents of the table-identifier field are set to a value that the garbage collector interprets as identifying the old table and indicating that the old table is undergoing replacement;
D) the table-replacing thread completes a table-replacement operation by performing a table-installation operation, in which the contents of the table-identifier field are set to a value that the garbage collector interprets as identifying the new table and indicating that it is not undergoing replacement;
E) the replacement-status determination comprises:
  i) reading the contents of the table-identifier field associated with the given remembered set; and
  ii) inferring therefrom whether the remembered-set table associated with that remembered set is currently undergoing replacement; and F) the record-addition operation includes writing into the table-identifier field a value that the garbage collector interprets as identifying the insertion-record list and indicating that the old table is undergoing replacement.

6. A method as defined in claim 5 wherein the record-addition operation comprises successfully making a record-addition attempt, which:
A) includes:
  i) performing an insertion-record-creation operation, in which an insertion record is created that includes:
    a) a record field, whose contents identify a region that includes the location of the given reference; and
    b) a link field, which, at least if the contents last read by the garbage-collection thread making the record-addition attempt from the table-identifier field associated with the given heap section identify another insertion record, contains an identifier of the insertion record thereby identified; and
  ii) making a record-insertion attempt, which comprises atomically:
    a) reading the contents of the table-identifier field associated with the given heap section;
    b) determining whether the contents thereby read are the same as the previously read contents of that field;
    c) if those contents are thereby determined to be the same as the contents previously read, succeeding by placing an identifier of the new insertion record into the table-identifier field associated with the given heap section; and
    d) otherwise, failing by not changing the table-identifier field's contents;
B) succeeds if the record-insertion attempt is successful; and
C) otherwise fails.

7. A method as defined in claim 6 wherein the contents that are placed into an insertion record's link field as part of the record-insertion operation are those last read from the table-identifier field by the garbage-collector thread performing that operation.

8. A method as defined in claim 6 wherein the table-replacement operation includes successfully performing a table-installation attempt, which comprises atomically:
A) reading the contents of the table-identifier field associated with the given heap section;
B) determining whether the contents thereby read identify the old table and indicate that it is being replaced; and
C) if those contents are thereby determined to identify the old table and indicate that it is being replaced, succeeding by changing the contents of the table-identifier field associated with the given heap section to a value that identifies the new table and indicates that it is not being replaced; and
D) otherwise failing by not changing the table-identifier field's contents.

9. A method as defined in claim 8 wherein, for each insertion-record list associated with the given remembered set, the record-transfer operation includes a list-claiming operation, which includes replacing an identifier of that insertion-record list in the table-identifier field with contents that identify the old table and indicate that it is currently being replaced.

10. A method as defined in claim 9 wherein, for a given insertion-record list, the list-claiming operation comprises atomically:

A) reading an identifier of that list from the table-identifier field associated with the given heap section; and
B) replacing that field's contents with contents that identify the old table and indicate that it is currently being replaced.

11. A method as defined in claim 10 wherein the list-claiming operation includes:
A) initially reading as an expected value an identifier of an insertion-record list from the table-identifier field associated with the given heap section; and
B) successfully performing a list-claim attempt, which comprises atomically:
   i) again reading the contents of the table-identifier field associated with the given heap section;
   ii) determining whether the contents thereby read equal the expected value;
   iii) if they do, succeeding by replacing those contents with contents that identify the old table and indicate that it is currently being replaced; and
   iv) otherwise failing by refraining from replacing those contents.

12. A method as defined in claim 10 wherein the table-replacement operation begins with successful performance of a table-claim attempt, which comprises atomically:
A) reading the contents of the table-identifier field associated with the given heap section;
B) determining whether the contents thereby read identify the old table and indicate that it is not being replaced;
C) if those contents are thereby determined to identify the old table and indicate that it is not being replaced, succeeding by changing the contents of the table-identifier field associated with the given heap section to a value that identifies the old table and indicates that the table is currently being replaced; and
D) if those contents are thereby determined either not to identify the old table or to indicate that it is already being replaced, failing by not changing the table-identifier field's contents.

13. A method as defined in claim 10 wherein the table-identifier field includes an identifier portion and a tag portion.

14. A method as defined in claim 13 wherein, when the tag portion has a predetermined normal value, the garbage collector interprets the table-identifier field as identifying the old table and indicating that the old table is not undergoing replacement.

15. A method as defined in claim 14 wherein, when the tag portion has a predetermined under-replacement value, the garbage collector interprets the table-identifier field as identifying the old table and indicating that the old table is undergoing replacement.

16. A method as defined in claim 15 wherein, when the tag portion has a predetermined list-indicating value, the garbage collector interprets the table-identifier field as identifying the insertion-record list and indicating that the old table is undergoing replacement.

17. A method as defined in claim 16 wherein:
A) the contents of the N>1 least-significant bits of the address of each remembered-set table are the same as those of the N least-significant bits of the address of every other remembered-set table;
B) the contents of the N least-significant bits of the address of each insertion record are the same as those of the N least-significant bits of the address of every other insertion record;
C) the tag portion of the table-identifier field consists of the N least-significant bits thereof;

D) when the tag has the normal value or the under-replacement value, the identifier portion of the table-identifier field contains all but the N least-significant bits of the address of the remembered-set table associated with the given remembered set; and
E) when the tag has the list-indicating value, the identifier portion of the table-identifier field contains all but the N least-significant bits of the address of the first insertion record in the insertion-record list associated with the given remembered set.

18. A method as defined in claim 5 wherein:
A) the garbage collector associates an old-table field with each of at least some of the heap sections and thus with the remembered set associated therewith;
B) the table-replacement operation includes placing an identifier of the old table in the old-table field; and
C) at least when the contents of the old-table field identify the old table and the contents of the table-identifier field identify an insertion-record list, the table-update attempt includes employing the contents of the old-table field to find the old table.

19. A method as defined in claim 1 wherein the reference-recording operation includes the record-addition operation only if the table-update attempt fails.

20. A method as defined in claim 19 wherein:
A) at least if the remembered-set table associated with the given heap section is currently being replaced by another thread, the table-update attempt includes a duplicate-finding attempt, which includes at least one said target-access operation, in which the target slot is read to determine whether it contains a reference-location identifier identifying a region containing the object to which the given reference refers;
B) the duplicate-finding attempt succeeds if the target slot is thereby determined to contain such a reference-location identifier;
C) the duplicate-finding attempt otherwise fails; and
D) the table-update succeeds if the duplicate-finding attempt succeeds.

21. A method as defined in claim 20 wherein, if the duplicate-finding attempt fails, the table-update attempt includes an effective-entry attempt, in which an attempt is made to add a reference-location identifier to the given remembered set by placing a reference-location identifier in the remembered-set table associated therewith.

22. A method as defined in claim 21 wherein the effective-entry attempt includes:
A) includes:
   i) making a slot-filling attempt, which includes:
      a) performing at least one said target-access operation to determine whether the target slot is empty;
      b) if the target slot is empty, succeeding by performing a slot-filling operation, which includes placing a reference-location identifier in the target slot; and
      c) otherwise failing; and
   ii) if the slot-filling attempt is successful, making an effectiveness determination, which is:
      a) affirmative at least if the remembered-set table being updated has not been replaced and is not currently undergoing replacement; and
      b) negative at least if the remembered-set table being updated has already been replaced;
B) succeeds if the slot-filling attempt is successful and the effectiveness determination is affirmative; and
C) fails if the effectiveness determination is negative.

23. A method as defined in claim 22 wherein:
A) the garbage collector associates with the old table a next-slot field that identifies a slot in that table;
B) the old-table-transfer operation includes performing, in a predetermined slot order for each slot in the old remembered-set table that contains a reference-locator entry, an old-entry-transfer operation in which an entry is placed in the new table if necessary to make the regions identified by the new remembered-set table include the one identified by the contents of that slot in the old remembered-set table; and
C) the old-table-transfer operation includes repeatedly so updating the contents of the next-slot field that the slot for which the old-entry-transfer operation is being performed is never farther along in the slot order than the slot identified by the contents of the next-slot field.

24. A method as defined in claim 23 wherein the effectiveness determination comprises reading the contents of the next-slot field, is negative if those contents indicate that an old-table-transfer operation has already reached that slot, and is otherwise affirmative.

25. A method as defined in claim 19 wherein the record-addition operation comprises successfully making a record-addition attempt, which:
A) includes:
  i) performing an insertion-record-creation operation, in which an insertion record is created that identifies a region that includes the location of the given reference; and
  ii) making a record-insertion attempt, in which an attempt is made to place the insertion record thus created into an insertion-record list associated with the given heap section;
B) succeeds if the record-insertion attempt is successful; and
C) otherwise fails.

26. A method as defined in claim 25 wherein:
A) the garbage collector associates a respective table-identifier field with each of at least some of the remembered sets;
B) when a remembered-set table associated with a given remembered set is not undergoing replacement, the table-identifier field associated with the given remembered contains a value that the garbage collector interprets as identifying that remembered-set table and as indicating that it is not undergoing replacement;
C) the table-replacing thread commences a table-replacement operation by performing a table-claim operation in which the contents of the table-identifier field are set to a value that the garbage collector interprets as identifying the old table and indicating that the old table is undergoing replacement;
D) the table-replacing thread completes a table-replacement operation by performing a table-installation operation, in which the contents of the table-identifier field are set to a value that the garbage collector interprets as identifying the new table and indicating that it is not undergoing replacement;
E) the replacement-status determination comprises:
  i) reading the contents of the table-identifier field associated with the given remembered set; and
  ii) inferring therefrom whether the remembered-set table associated with that remembered set is currently undergoing replacement; and
F) the record-addition operation includes writing into the table-identifier field contents that the garbage collector interprets as identifying the insertion-record list and indicating that the old table is undergoing replacement.

27. A method as defined in claim 26 wherein:
A) the insertion record includes
  i) a record field, whose contents identify a region that includes the location of the given reference; and
  ii) a link field, which, at least if the contents last read by the garbage-collection thread making the record-addition attempt from the table-identifier field associated with the given heap section identify another insertion record, contains an identifier of the insertion record thereby identified; and
B) the record-insertion attempt comprises atomically:
  i) reading the contents of the table-identifier field associated with the given heap section;
  ii) determining whether the contents thereby read are the same as the previously read contents of that field; and
  iii) if those contents are thereby determined to be the same as the contents previously read, succeeding by placing an identifier of the new insertion record into the table-identifier field associated with the given heap section; and
C) otherwise failing by not changing the table-identifier field's contents.

28. A method as defined in claim 25 wherein, in at least some instances in which the record-addition attempt fails, the reference-recording operation includes making a further record-addition attempt.

29. A method as defined in claim 28 wherein, in at least some instances in which the record-addition attempt fails, the reference-recording operation is repeated.

30. A computer system comprising:
A) processor circuitry operable to execute processor instructions; and
B) memory circuitry, to which the processor circuitry is responsive, that includes a heap in which memory space is dynamically allocated and that contains processor instructions readable by the processor circuitry to configure the computer system as a garbage collector that:
  i) scans at least some of the heap for references;
  ii) treats at least a portion of the heap as divided into heap sections with each of at least some of which the garbage collector associates a respective remembered set of reference-location identifiers, recorded in respective slots in a remembered-set table associated with that remembered set and thereby with that heap section, that identify regions where references to objects in that heap section have been found;
  iii) executes in a plurality of garbage-collector threads a remembered-set-maintenance operation in which:
    a) at least one of the garbage-collector threads performs a table-replacement operation, which, for a given remembered-set table, includes:
      (1) an old-table-transfer operation, in which reference-location identifiers that identify regions containing all locations contained in regions identified by the reference-location identifiers in the remembered-set table, denominated the old remembered-set table, that is associated with a given remembered set are placed into a new remembered-set table; and
      (2) a table-installation operation, in which the old remembered-set table is replaced with the new remembered-set table;

b) at least another one of the garbage-collector threads performs a reference-recording operation, which, for a given reference to an object in a given heap section, includes:
(1) in at least some instances in which the given heap section is currently being replaced by a different garbage-collector thread, performing at least one table-access operation, in which a target slot chosen in accordance with a placement rule is accessed;
(2) at least if that remembered-set table is not currently undergoing replacement, making a table-update attempt, in which an attempt is made to place a table-location identifier into the target slot if necessary to ensure that the given reference's location is included in a region identified by a reference-location identifier in that remembered-set table;
(3) in at least some instances, making a replacement-status determination, in which a determination is made of whether that table is currently undergoing replacement;
(4) in at least some instances in which the replacement-status determination is affirmative, performing a record-addition operation, which includes placing an insertion record containing such a reference-location identifier into an insertion-record list associated with the given heap section; and
(5) refraining from performing a record-addition operation if the replacement-status determination is negative; and
c) if an insertion-record list is associated with the given remembered set, the table-replacement operation includes performing a record-transfer operation, in which, for each reference-location identifier contained in an insertion record in such an insertion-record list, a table-location identifier is placed in the new table if necessary to ensure that the regions identified by the reference-location identifiers in the new table include the region identified by the reference-location identifier contained in that insertion record;
iv) employs the remembered sets thereby maintained to identify potentially reachable objects; and
v) reclaims memory space occupied by objects not identified as potentially reachable.

31. A storage medium containing instructions readable by a computer system, which includes memory including a heap in which space is dynamically allocated, to configure the computer system to operate as a garbage collector that:
A) scans at least some of the heap for references;
B) treats at least a portion of the heap as divided into heap sections with each of at least some of which the garbage collector associates a respective remembered set of reference-location identifiers, recorded in respective slots in a remembered-set table associated with that remembered set and thereby with that heap section, that identify regions where references to objects in that heap section have been found;
C) executes in a plurality of garbage-collector threads a remembered-set-maintenance operation in which:
i) at least one of the garbage-collector threads performs a table-replacement operation, which, for a given remembered-set table, includes:
a) an old-table-transfer operation, in which reference-location identifiers that identify regions containing all locations contained in regions identified by the reference-location identifiers in the remembered-set table, denominated the old remembered-set table, that is associated with a given remembered set are placed into a new remembered-set table; and
b) a table-installation operation, in which the old remembered-set table is replaced with the new remembered-set table;
ii) at least another one of the garbage-collector threads performs a reference-recording operation, which, for a given reference to an object in a given heap section, includes:
a) in at least some instances in which the given heap section is currently being replaced by a different garbage-collector thread, performing at least one table-access operation, in which a target slot chosen in accordance with a placement rule is accessed;
b) at least if that remembered-set table is not currently undergoing replacement, making a table-update attempt, in which an attempt is made to place a table-location identifier into the target slot if necessary to ensure that the given reference's location is included in a region identified by a reference-location identifier in that remembered-set table;
c) in at least some instances, making a replacement-status determination, in which a determination is made of whether that table is currently undergoing replacement;
d) in at least some instances in which the replacement-status determination is affirmative, performing a record-addition operation, which includes placing an insertion record containing such a reference-location identifier into an insertion-record list associated with the given heap section; and
e) refraining from performing a record-addition operation if the replacement-status determination is negative; and
iii) if an insertion-record list is associated with the given remembered set, the table-replacement operation includes performing a record-transfer operation, in which, for each reference-location identifier contained in an insertion record in such an insertion-record list, a table-location identifier is placed in the new table if necessary to ensure that the regions identified by the reference-location identifiers in the new table include the region identified by the reference-location identifier contained in that insertion record;
D) employs the remembered sets thereby maintained to identify potentially reachable objects; and
E) reclaims memory space occupied by objects not identified as potentially reachable.

32. A garbage collector comprising:
A) means for scanning at least some of a dynamically allocated heap in a computer system's memory for references;
B) means for treating at least a portion of the heap as divided into heap sections with each of at least some of which the garbage collector associates a respective remembered set of reference-location identifiers, recorded in respective slots in a remembered-set table associated with that remembered set and thereby with that heap section, that identify regions where references to objects in that heap section have been found;

C) means for executing in a plurality of garbage-collector threads a remembered-set-maintenance operation in which:
  i) at least one of the garbage-collector threads performs a table-replacement operation, which, for a given remembered-set table, includes:
    a) an old-table-transfer operation, in which reference-location identifiers that identify regions containing all locations contained in regions identified by the reference-location identifiers in the remembered-set table, denominated the old remembered-set table, that is associated with a given remembered set are placed into a new remembered-set table; and
    b) a table-installation operation, in which the old remembered-set table is replaced with the new remembered-set table;
  ii) at least another one of the garbage-collector threads performs a reference-recording operation, which, for a given reference to an object in a given heap section, includes:
    a) in at least some instances in which the given heap section is currently being replaced by a different garbage-collector thread, performing at least one table-access operation, in which a target slot chosen in accordance with a placement rule is accessed;
    b) at least if that remembered-set table is not currently undergoing replacement, making a table-update attempt, in which an attempt is made to place a table-location identifier into the target slot if necessary to ensure that the given reference's location is included in a region identified by a reference-location identifier in that remembered-set table;
    c) in at least some instances, making a replacement-status determination, in which a determination is made of whether that table is currently undergoing replacement;
    d) in at least some instances in which the replacement-status determination is affirmative, performing a record-addition operation, which includes placing an insertion record containing such a reference-location identifier into an insertion-record list associated with the given heap section; and
    e) refraining from performing a record-addition operation if the replacement-status determination is negative; and
  iii) if an insertion-record list is associated with the given remembered set, the table-replacement operation includes performing a record-transfer operation, in which, for each reference-location identifier contained in an insertion record in such an insertion-record list, a table-location identifier is placed in the new table if necessary to ensure that the regions identified by the reference-location identifiers in the new table include the region identified by the reference-location identifier contained in that insertion record;

D) means for employing the remembered sets thereby maintained to identify potentially reachable objects; and E) means for reclaiming memory space occupied by objects not identified as potentially reachable.

* * * * *